(12) United States Patent
Tateishi

(10) Patent No.: US 12,200,343 B2
(45) Date of Patent: Jan. 14, 2025

(54) CONTROL APPARATUS, METHOD OF CONTROLLING CONTROL APPARATUS, CONTROL METHOD, AND STORAGE MEDIUM

(71) Applicant: CANON KABUSHIKI KAISHA, Tokyo (JP)

(72) Inventor: Tomohiro Tateishi, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 133 days.

(21) Appl. No.: 18/061,122

(22) Filed: Dec. 2, 2022

(65) Prior Publication Data

US 2023/0179854 A1 Jun. 8, 2023

(30) Foreign Application Priority Data

Dec. 7, 2021 (JP) .................. 2021-198715

(51) Int. Cl.
*H04N 23/611* (2023.01)
*G06V 40/18* (2022.01)
*H04N 23/63* (2023.01)

(52) U.S. Cl.
CPC ......... *H04N 23/611* (2023.01); *G06V 40/197* (2022.01); *H04N 23/632* (2023.01); *H04N 23/635* (2023.01)

(58) Field of Classification Search
CPC ... H04N 23/611; H04N 23/635; G06V 40/197
See application file for complete search history.

(56) References Cited

FOREIGN PATENT DOCUMENTS

| JP | 2004-008323 A | 1/2004 | |
|---|---|---|---|
| JP | 2020-106552 A | 7/2020 | |
| JP | 2022171084 A | * 11/2022 | ....... H04N 5/232127 |

* cited by examiner

*Primary Examiner* — Minh Q Phan
(74) *Attorney, Agent, or Firm* — Cowan, Liebowitz & Latman, P.C.

(57) ABSTRACT

A control apparatus that is capable of quickly and easily reducing the positional deviation of a gaze point, occurring whenever a photographer's eye is brought into contact with a viewfinder. A position corresponding to a gaze point of a user is estimated and corrected based on a position of an indicator displayed on a display section and the position corresponding to the gaze point of the user associated with the position of the indicator. In a first mode, the correction is performed based on positions of a first number of indicators, and in a second mode, the correction is performed based on a second number, smaller than the first number, of indicators.

14 Claims, 13 Drawing Sheets

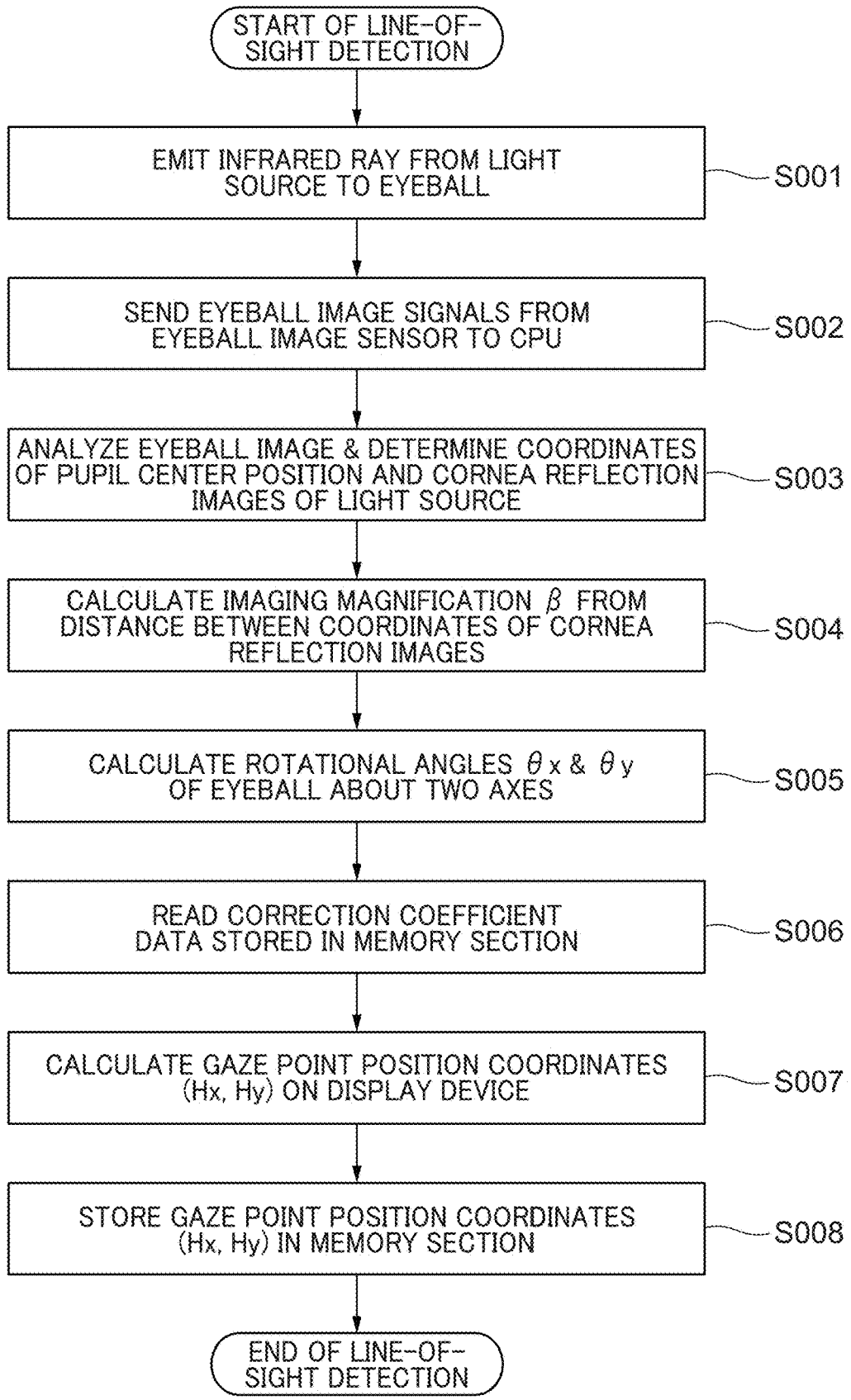

CONTROL APPARATUS, METHOD OF CONTROLLING CONTROL APPARATUS, CONTROL METHOD, AND STORAGE MEDIUM

BACKGROUND OF THE INVENTION

Field of the Invention

The present invention relates to a control apparatus that reduces the positional deviation of a gaze point, a control apparatus, a method of controlling the control apparatus, a control method, and a storage medium.

Description of the Related Art

In recent years, the operation of cameras has come to be automatized and the cameras have come to be made intelligent. Japanese Laid-Open Patent Publication (Kokai) No. 2004-8323 discloses a camera control apparatus that is capable of recognizing an object intended by a photographer and controlling the focus, based on information on a line-of-sight position of the photographer looking into a viewfinder, without requiring a manual input of an object position. When a camera detects a gaze point position (line-of-sight position) of a photographer as described above, the gaze point position intended by the photographer and the line-of-sight position, recognized by the camera, of the photographer sometimes deviate from each other, and in this case, it is impossible to focus on an object intended by the photographer. To solve this problem, an apparatus described in Japanese Laid-Open Patent Publication (Kokai) No. 2004-8323 displays indicators within a viewfinder before photographing and instructs a photographer to gaze at the displayed indicators. The gaze point position of the photographer is detected in a state in which the photographer is gazing at the indicators, and an amount of deviation from the position of each indicator is detected. Then, the detected gaze point position, recognized by the camera, of the photographer is corrected (calibrated) by this amount of deviation when photographing is performed, whereby it is possible to detect the corrected position as the gaze point position as intended by the photographer. Further, in an apparatus described in Japanese Laid-Open Patent Publication (Kokai) No. 2020-106552, the gaze point position can be changed for adjustment on a display device by a photographer.

In the apparatus described in Japanese Laid-Open Patent Publication (Kokai) No. 2004-8323, in a case where positional deviation occurs between a gaze point position intended by the photographer and a gaze point position detected by the camera, correction is performed by the above-described calibration. However, whenever the photographer's eye is brought into contact with the viewfinder of the camera, the eye-contact position slightly changes, and hence the gaze point position detected by the camera also changes in accordance with the eye-contact position. In this case, execution of the calibration is frequently required whenever the photographer's eye is brought into contact with the viewfinder, and as a result, a problem occurs that the calibration becomes troublesome. Further, in the apparatus described in Japanese Laid-Open Patent Publication (Kokai) No. 2020-106552, when the accuracy of correction performed by the calibration is taken into consideration, it is preferable that the gaze point position at the time of calibration is fixed rather than changeable.

SUMMARY OF THE INVENTION

The present invention provides a control apparatus that is capable of quickly and easily reducing the positional deviation of a gaze point, occurring whenever a photographer's eye is brought into contact with a viewfinder, and improves the convenience of photographing, a method of controlling the control apparatus, a control method, and a storage medium.

In a first aspect of the present invention, there is provided a control apparatus including at least one processor, and a memory coupled to the at least one processor, the memory having instructions that, when executed by the processor, perform the operations as: an estimation unit configured to estimate a position corresponding to a gaze point of a user, and a correction unit configured to correct the position corresponding to the gaze point of the user, based on a position of an indicator displayed on a display section and the position corresponding to the gaze point of the user and associated with the position of the indicator, wherein the correction unit has a first mode for performing the correction based on positions of a first number of indicators and a second mode for performing the correction based on a second number, smaller than the first number, of indicators.

In a second aspect of the present invention, there is provided a control apparatus including at least one processor, and a memory coupled to the at least one processor, the memory having instructions that, when executed by the processor, perform the operations as: a control unit configured to control display performed by a display unit that displays an indicator used for calibration for detection of a gaze point of a user, and wherein the control unit causes the display unit to display a first number of indicators in first calibration and display a second number, smaller than the first number, of indicators in second calibration executed after the first calibration.

In a third aspect of the present invention, there is provided a method of controlling a control apparatus, including estimating a position corresponding to a gaze point of a user, and correcting the position corresponding to the gaze point of the user, based on a position of an indicator displayed on a display section and the position corresponding to the gaze point of the user and associated with the position of the indicator, wherein said correcting is performed in at least one of a first mode for performing the correction based on positions of a first number of indicators and a second mode for performing the correction based on a second number, smaller than the first number, of indicators.

In a fourth aspect of the present invention, there is provided a control method, including controlling display performed by a display unit that displays an indicator used for calibration for detection of a gaze point of a user, wherein said controlling includes causing the display unit to display a first number of indicators in first calibration and display a second number, smaller than the first number, of indicators in second calibration executed after the first calibration.

According to the present invention, it is possible to quickly and easily reduce the positional deviation of a gaze point, occurring whenever a photographer's eye is brought into contact with a viewfinder, and improve the convenience of photographing.

Further features of the present invention will become apparent from the following description of exemplary embodiments (with reference to the attached drawings).

BRIEF DESCRIPTION OF THE DRAWINGS

FIG. 7 is a flowchart of a line-of-sight detection process.

DESCRIPTION OF THE EMBODIMENTS

The present invention will now be described in detail below with reference to the accompanying drawings showing embodiments thereof. However, the configurations in the following embodiments are described only by way of example, and are by no means intended to limit the scope of the present invention.

First, a first embodiment will be described with reference to FIGS. 1A to 9.

Figure 1A:
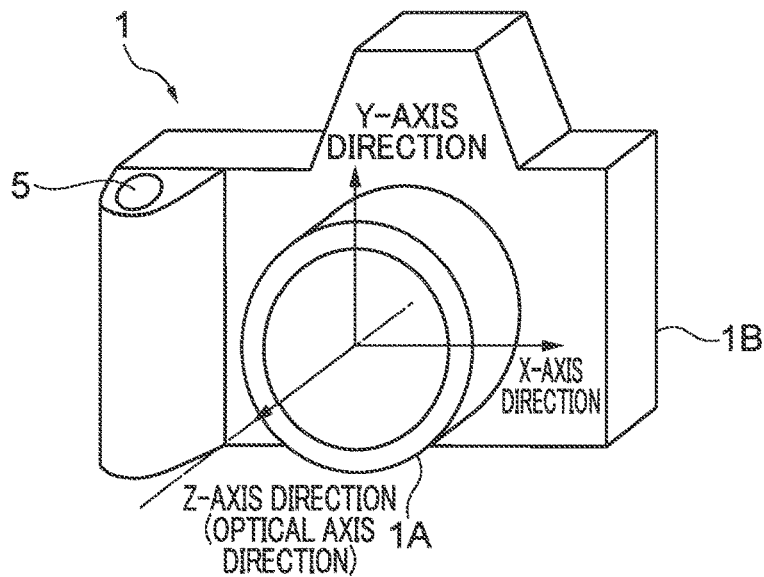
FIGS. 1A to 1C are schematic views useful in explaining the appearance of a digital still camera.
Figure 1B:
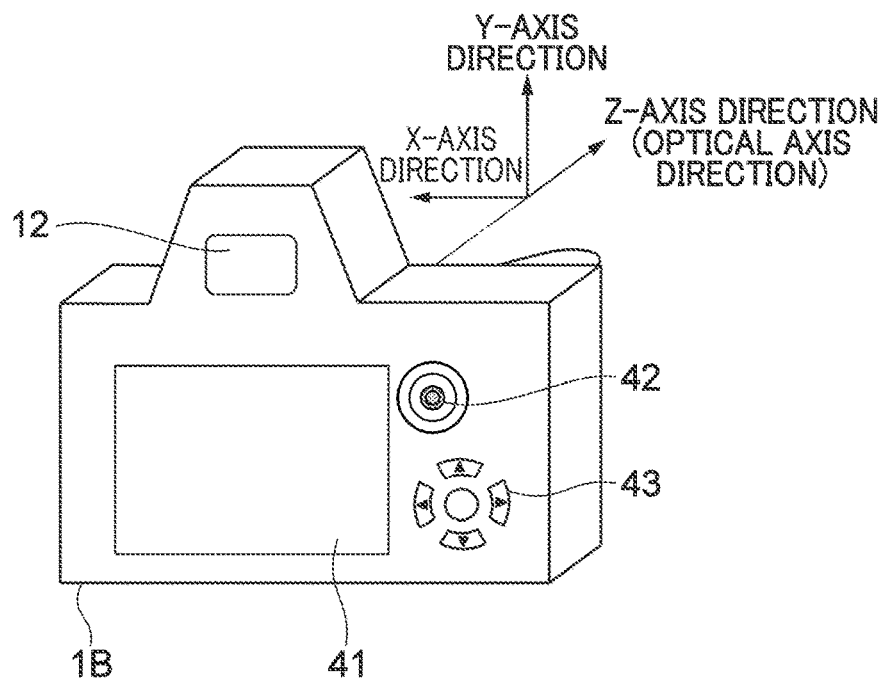
Figure 1C:
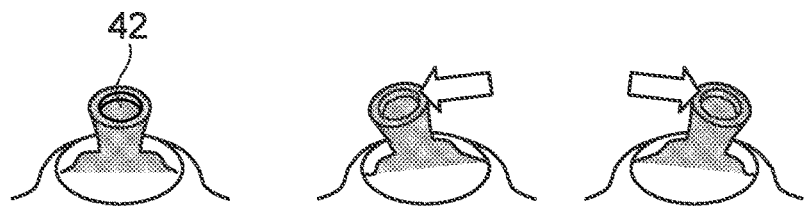

FIGS. 1A to 1C are schematic views each showing the appearance of a digital still camera. FIG. 1A and FIG. 1B are a front perspective view and a rear perspective view of the digital still camera, respectively, and FIG. 1C is a set of perspective views of an operation lever included in the digital still camera, in respective operated states. As shown in FIG. 1A, the digital still camera, denoted by reference numeral 1 (hereinafter referred to as the "camera 1"), which is a control apparatus, has a photographing lens 1A and a camera body 1B. On an upper side of the camera body 1B, a release button 5 that receives an image capturing operation from a user (photographer) is disposed. Further, as shown in FIG. 1B, on a rear side of the camera body 1B, there are arranged an eyepiece lens 12 used by a user to look into a display device provided inside the camera 1, and operation members 41 to 43 used to operate the camera 1. An operation member 41 is a touch panel liquid crystal display (operation member a), an operation member 42 is a lever-type operation member (operation member 0), and an operation member 43 is a button cross key (operation member y).

Figure 2:
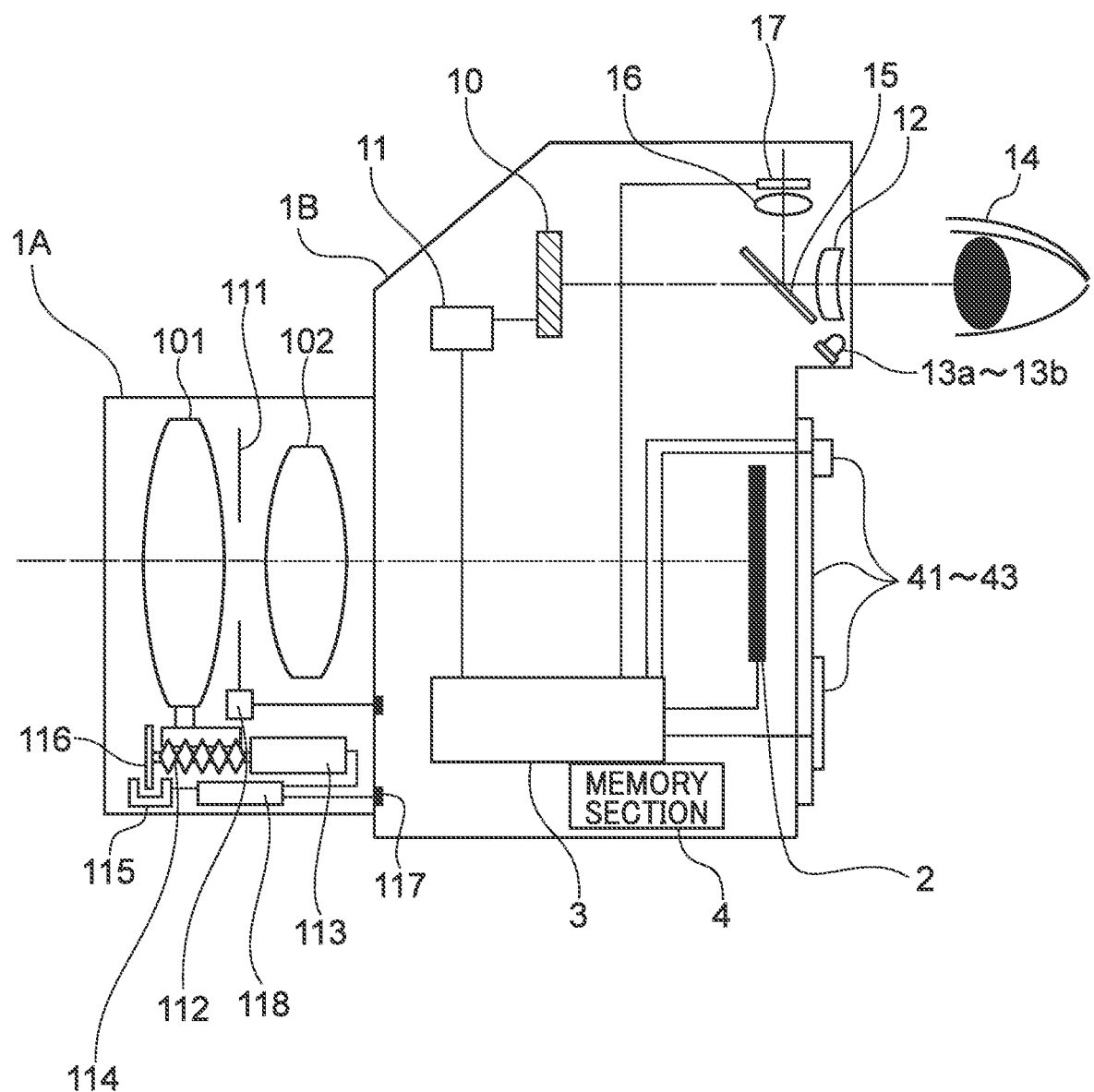
FIG. 2 is a schematic view of the inside of the digital still camera.

FIG. 2 is a schematic view of the inside of the digital still camera. As shown in FIG. 2, the photographing lens 1A has a lens 101 and a lens 102. Note that although the number of lenses is two in the present embodiment, this is not limitative, but for example, it may be three or more. Further, the photographing lens 1A includes a diaphragm 111, a diaphragm driving unit 112, a lens driving motor 113, a lens driving member 114, a photocoupler 115, a pulse plate 116, a mount contact 117, and a lens focus adjustment circuit 118. The lens driving member 114 is comprised of a driving gear. The photocoupler 115 detects rotation of the pulse plate 116 which is rotated in accordance with the lens driving member 114 and notifies the lens focus adjustment circuit 118 of rotation information. The lens focus adjustment circuit 118 causes the lens driving motor 113 to drive the lens 101 by a predetermined amount based on this rotation information and information on a lens driving amount received from the camera body side. With this, it is possible to move the lens 101 to an in-focus position. The mount contact 117 is an interface with the camera body.

In the camera body 1B, there are arranged an image sensor (image capturing section) 2, a CPU 3, a memory section 4, a display device (display section) 10, a display device-driving circuit 11, and the eyepiece lens 12. Further, in the camera body 1B, there are arranged a light source (illuminating light source) 13a, a light source (illuminating light source) 13b, a light splitter 15, a light receiving lens 16, and an eyeball image sensor (eyeball image capturing section) 17. The image sensor 2 is disposed on an expected imaging plane of the photographing lens 1A of the camera 1 and is capable of imaging an object. The CPU 3 is a central processing unit (controller) of a microcomputer incorporated in the camera body and functions as a control unit configured to control the overall operation (control process steps; control method) of the camera. Further, programs for causing the CPU 3 to execute operations of the components and units of the camera 1 (method of controlling the control apparatus) are stored in a memory, not shown, which is different from the memory section 4, in advance. The memory section 4 records an image captured by the image sensor 2. The display device 10 is comprised of a liquid crystal layer forming a display screen having a rectangular shape, and is capable of displaying e.g. an image of an object, which is captured by the image sensor 2, according to driving control from the display device-driving circuit 11. The eyepiece lens 12 is an eyepiece portion with which an eye of the user is brought into contact when the user observes (visually recognizes) an object image displayed on the display device 10. The light source 13a and the light source 13b are provided for illuminating an eyeball 14 of the user to detect a direction of a line of sight based on a relationship between an eyeball image and an image reflected from a cornea, and is implemented e.g. by an infrared light-emitting diode. The light source 13a and the light source 13b are arranged around the eyepiece lens 12. Light from the eyeball 14 and light from the cornea are transmitted through the eyepiece lens 12, reflected by the light splitter 15, and formed into the eyeball image and the reflected image on the eyeball image sensor 17, respectively, by the light receiving lens 16. The light receiving lens 16 sets a pupil of the eyeball 14 of the user and the eyeball image sensor 17 in a conjugated imaging relation. The eyeball image sensor 17 is a device formed by photoelectric elements, such as CCDs, arranged two-dimensionally (in a matrix), and captures an image of the eyeball 14 of the user. In the camera 1, it is possible to detect a line-of-sight direction by using a predetermined algorithm, described hereinafter, based on a positional relationship between the eyeball 14 imaged on the eyeball image sensor 17 and the reflected image. Note that the memory section 4 has a function of storing image signals output from the image sensor 2 and the eyeball image sensor 17, and a function of storing line-of-sight correction data, described hereinafter, for correcting a difference in the line of sight among individuals (individual difference).

Figure 3:
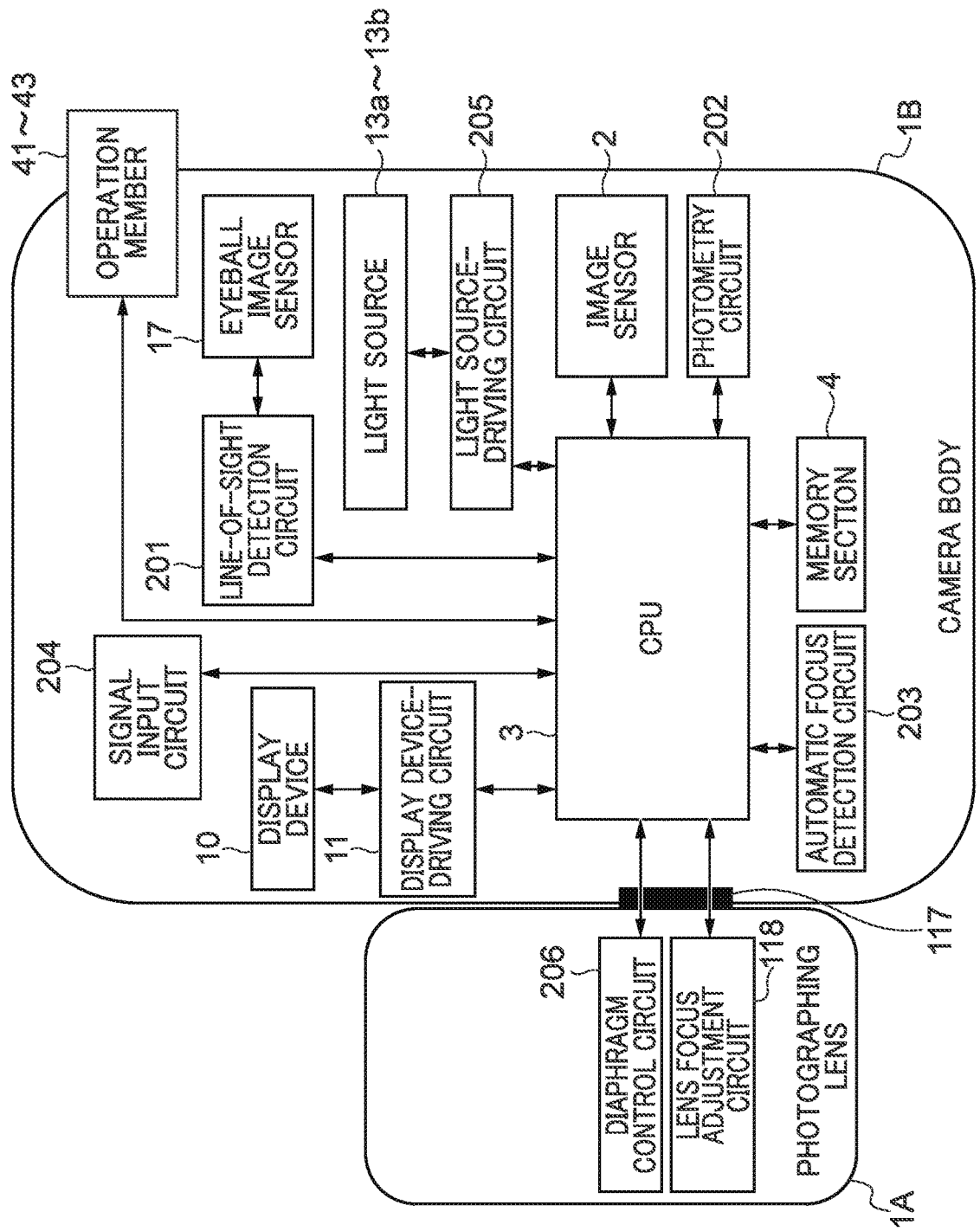
FIG. 3 is a block diagram of the digital still camera.

FIG. 3 is a block diagram of the digital still camera. As shown in FIG. 3, to the CPU 3, a line-of-sight detection circuit 201, a photometry circuit 202, an automatic focus detection circuit 203, a signal input circuit 204, a light source-driving circuit 205, and the display device-driving circuit 11 are electrically connected. The line-of-sight detection circuit 201 converts an output from the eyeball image sensor 17 that performs imaging of an eyeball, from analog to digital, and sends image information of the output to the CPU 3. The CPU 3 extracts feature points of the eyeball image, necessary for detecting a line of sight, according to a predetermined algorithm, described hereinafter, and calculates a line of sight of the user based on positions of the feature points. Based on signals obtained from the image sensor 2 which also functions as a photometry sensor, the photometry circuit 202 amplifies a luminance signal corresponding to the brightness of a field, then performs logarithmic compression and analog-to-digital conversion on the amplified luminance signal, and sends the resulting signal to the CPU 3 as field luminance information. The automatic focus detection circuit 203 converts voltage signals from a plurality of pixels included in the image sensor 2 (CCD) and used for phase difference detection, from analog to digital, and sends the digital signals to the CPU 3. The CPU 3 calculates distances to an object, which are associated with focus detection points, respectively, based on the signals obtained from the plurality of pixels. This is a technique known as imaging plane phase difference autofocusing (AF) In the present embodiment, it is assumed that there are 180 focus detection points by way of example, as shown in FIG. 4. To the signal input circuit 204, a switch SW1, not shown, which is turned on by a first stroke of the release button 5 and a switch SW2, not shown, which is turned on by a second stroke of the release button 5 are connected. When the switch SW1 is turned on, photometry, ranging, line-of-sight detection operations, and the like of the camera are started. When the switch SW2 is turned on, a release operation is started. More specifically, a signal generated by operating the release button 5 is sent to the CPU 3 via the signal input circuit 204. The light source-driving circuit 205 controls driving, i.e. ON/OFF of the light source 13a and the light source 13b. Further, signals are transmitted between the lens focus adjustment circuit 118 and a diaphragm control circuit 206 included in the diaphragm driving circuit 112, which are disposed within the photographing lens 1A, and the camera body via the mount contact 117.

Figure 4A:
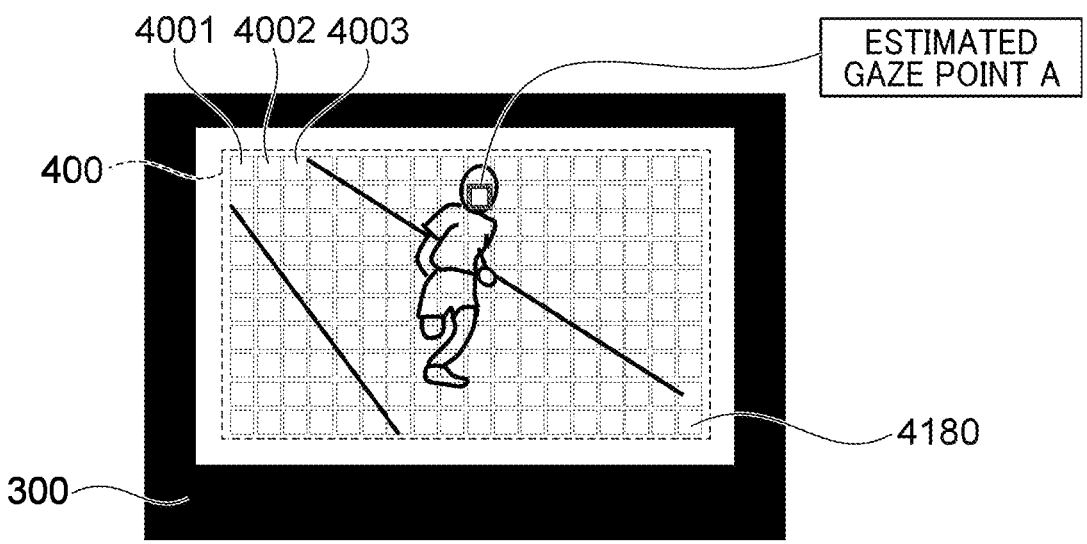
FIGS. 4A to 4C are diagrams each showing an in-finder field (image displaying state of a display device).
Figure 4B:
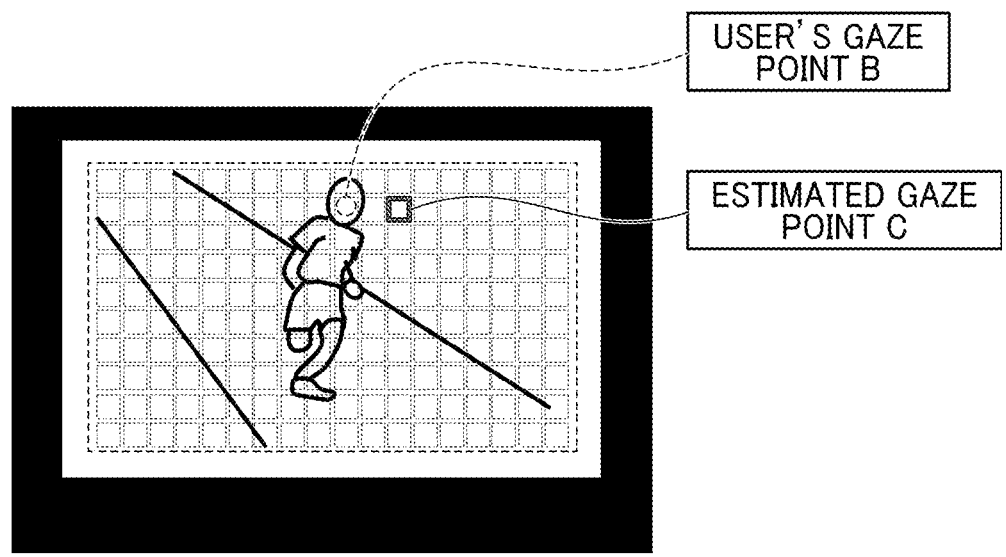
Figure 4C:
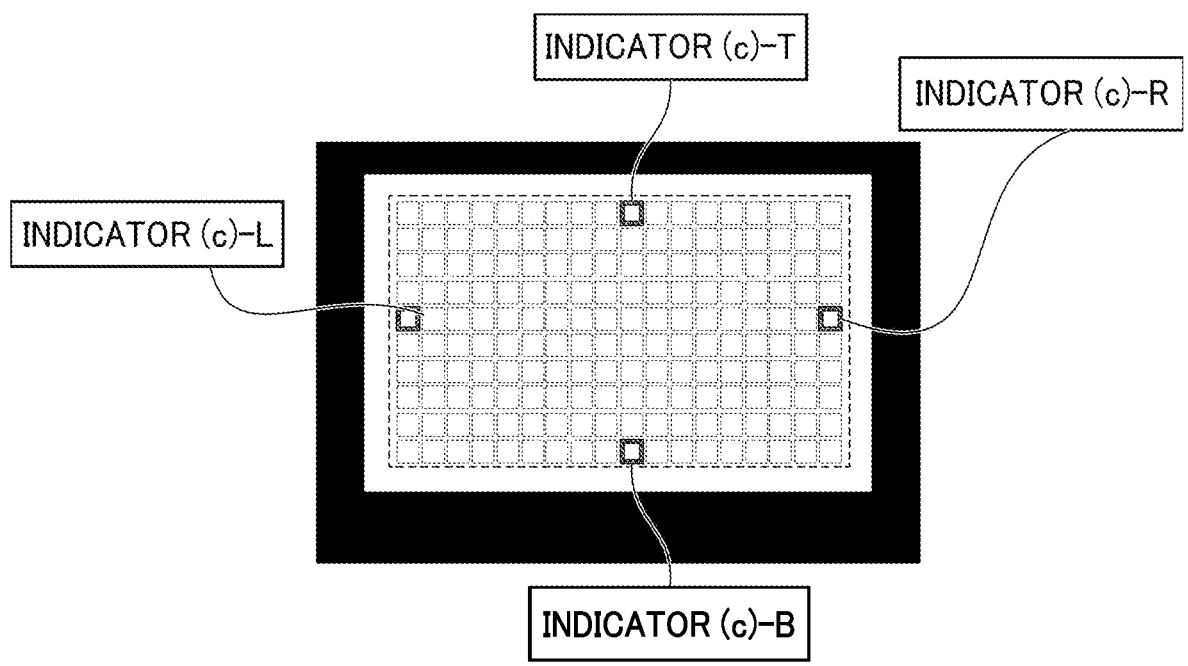

FIGS. 4A to 4C are diagrams each showing an in-finder field (image displaying state of the display device). As shown in FIG. 4A, in the in-finder field, it is possible to observe a field mask 300, a focus detection area 400, and 180 ranging point indicators 4001 to 4180 displayed in a state superimposed on a through image displayed on the display device 10. The ranging point indicators 4001 to 4180 are arranged at respective locations corresponding to the plurality of focus detection points on the imaging surface of the image sensor 2. Further, an indicator of the ranging point indicators 4001 to 4180, which corresponds to the current estimated gaze point position, is displayed as an estimated gaze point A. Although in the present embodiment, the estimated gaze point A is indicated by a frame shape, this is not limitative, but for example, the estimated gaze point A may be indicated e.g. by a dot shape.

Figure 5:
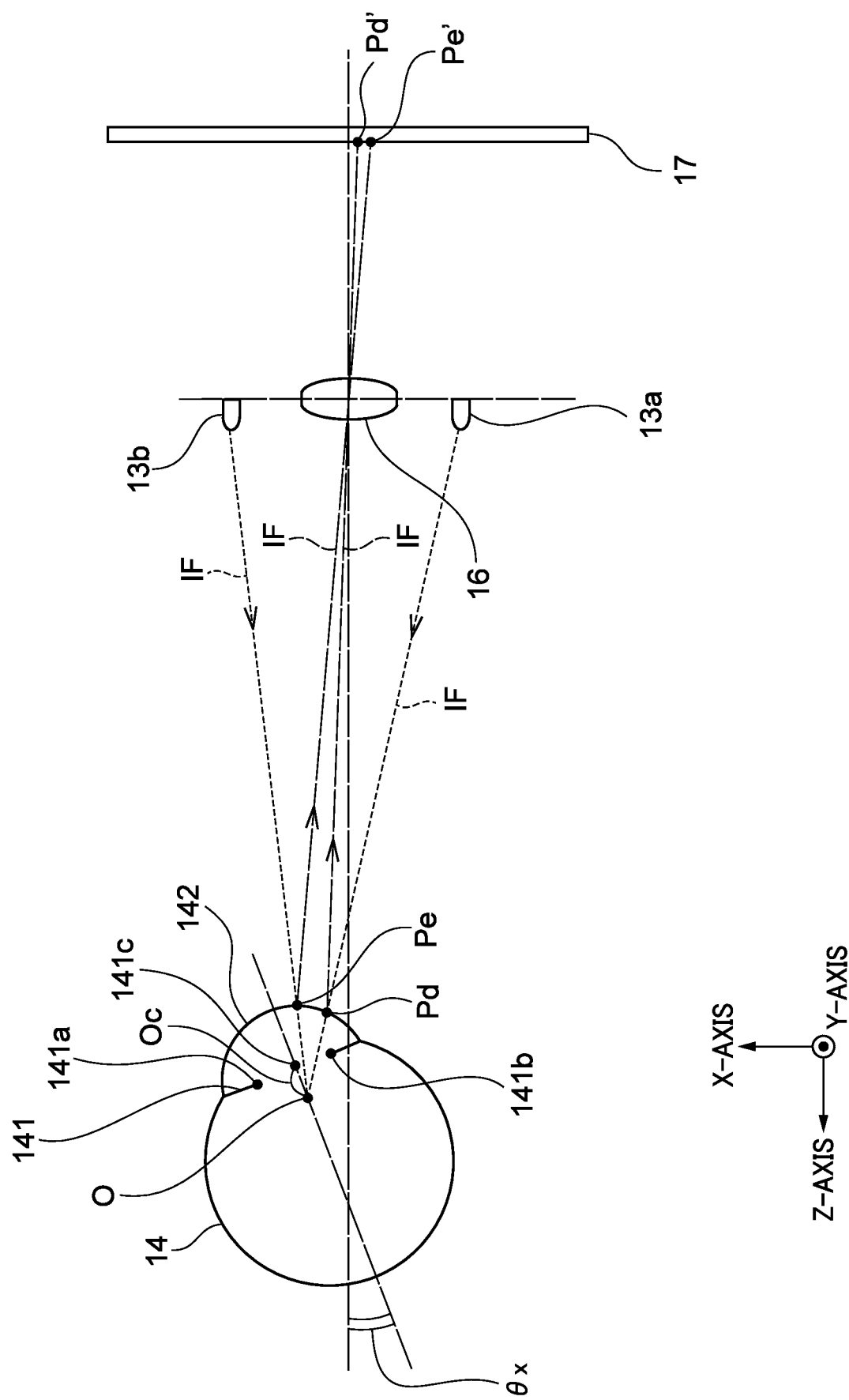
FIG. 5 is a schematic diagram showing a state in which an eyeball is irradiated with infrared light from a light source.
Figure 6:
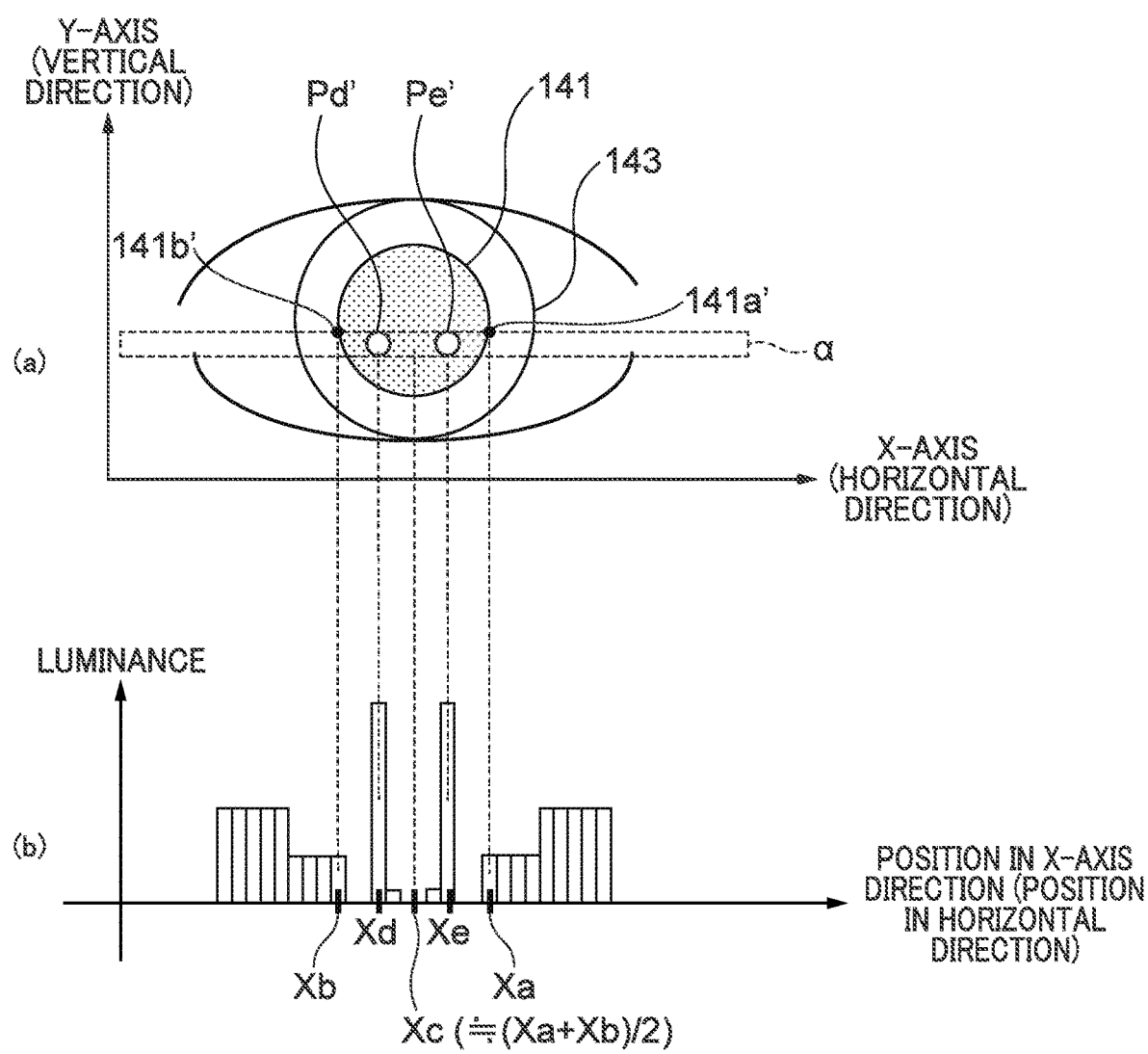
FIG. 6 is a diagram useful in explaining a principle of detecting a line-of-sight position (line of sight) in the state shown in FIG. 5.

FIG. 5 is a diagram showing a state in which an eyeball is irradiated with infrared light from the light sources. FIG. 6 is a diagram useful in explaining a principle of detecting a line-of-sight position (line of sight) in the state shown in FIG. 5. FIG. 6 (a) as an upper half of FIG. 6 schematically shows an eyeball image projected onto the eyeball image sensor, and FIG. 6 (b) as a lower half of FIG. 6 shows the luminance distribution of the eyeball image. Further, in each of FIGS. 5 and 6, an X-axis direction is a horizontal direction, a Y-axis direction is a vertical direction, and a Z-axis direction is a direction (optical axis direction of the light receiving lens 16) orthogonal to the X-axis direction and the Y-axis direction.

As shown in FIG. 5, the light source 13a and the light source 13b are arranged in line symmetry with respect to the optical axis of the light receiving lens 16 as the axis of symmetry. Note that this arrangement is illustrated different from the arrangement shown in FIG. 1 so as to make it easy to understand the principle of detecting a line-of-sight position. Fluxes of infrared light IF are emitted from the light source 13a and the light source 13b toward the eyeball 14 of the user, respectively. Then, portions of the fluxes of the infrared light IF reflected from a cornea 142 of the eyeball 14 are condensed by the light receiving lens 16 to form images on the eyeball image sensor 17. More specifically, the portions of the fluxes of the infrared light IF reflected from points Pd and Pe on the surface of the cornea 142 are condensed by the light receiving lens 16 to form an image (cornea reflection image) Pd' and an image (cornea reflection image) Pe' on the eyeball image sensor 17, respectively. Further, similar to this, light fluxes reflected from an end (pupil end) 141a and an end (pupil end) 141b of a pupil 141 also form an image 141a' and an image 141b' on the eyeball image sensor 17, respectively.

As shown in (a) and (b) of FIG. 6, the image Pd', the image Pe', the image 141a', and the image 141b' are included in a region a. A coordinate of the image Pd' in the X-axis direction is defined as Xd, and a coordinate of the image Pe' in the X-axis direction is defined as Xe. Further, a coordinate of the image 141a' in the X-axis direction is defined as Xa, and a coordinate of the image 141b' in the X-axis direction is defined as Xb. As shown in (b) in FIG. 6, very high level luminances are detected at the coordinate Xd and the coordinate Xe. Further, in a region between the coordinate Xa and the coordinate Xb, which corresponds to the area of the pupil 141, very low level luminances are detected except the luminance values at the coordinate Xd and the coordinate Xe. Further, in a region smaller than the coordinate Xa in the X-axis direction and a region larger than the coordinate Xb in the X-axis direction, which corresponding to an area of an iris 143 outside the pupil 141, middle level luminances are detected. Therefore, it is possible to determine the coordinate Xd, the coordinate Xe, the coordinate Xa, and the coordinate Xb, based on the luminance levels. Further, a coordinate in the X-axis direction of a point, corresponding to a pupil center 141c, on the eyeball image sensor 17 is defined as Xc. In a case where a rotational angle θx of the optical axis of the eyeball 14 with respect to the optical axis of the light receiving lens 16 is small, the coordinate Xc can be expressed as Xc≈(Xa+Xb)/2. Thus, the coordinate Xc, the coordinate Xd, and the coordinate Xe can be determined.

FIG. 7 is a flowchart of a line-of-sight detection process.

In a step S001, the CPU 3 causes the light source-driving circuit 205 to operate to emit infrared light from the light sources 13a and 13b toward the eyeball 14 of the user. With this, an image of the eyeball 14 of the user is formed on the eyeball image sensor 17 through the light receiving lens 16. Then, the eyeball image sensor 17 performs photoelectric conversion, whereby the image of the eyeball 14 is made capable of being processed as electrical signals (eyeball image signals). In a step S002, the line-of-sight detection circuit 201 transmits the eyeball image signals obtained by the eyeball image sensor 17 to the CPU 3. In a step S003, the CPU 3 determines the coordinate Xc, the coordinate Xd, and the coordinate Xe based on the eyeball image signals received in the step S002, as described above. In a step S004, an imaging magnification 3 of the eyeball image is calculated. The imaging magnification 3 is determined based on a position of the eyeball 14 with respect to the light receiving lens 16, and is substantially calculated as a function of a distance between the image Pd' and the image Pe' (Xd–Xe).

In a step S005, the CPU 3 calculates the rotational angle θx of the eyeball 14 about the Y-axis and a rotational angle θy of the same about the X-axis. Here, the X-coordinate of the midpoint between the image Pd' and the image Pe' and the X-coordinate of a curvature center O of the cornea 142 substantially coincide with each other. Therefore, assuming that an ordinary distance between the curvature center O of the cornea 142 and the center 141c of the pupil 141 is represented by Oc, the rotational angle θx can be calculated by the following expression (1). Note that the rotational angle θy can be similarly calculated.

$$\beta \times Oc \times \mathrm{SIN}\ \theta_x \approx ((Xd+Xe)/2) - Xc \quad (1)$$

In a step S006, the CPU 3 reads a line-of-sight correction coefficient Ax, a line-of-sight correction coefficient Bx, a line-of-sight correction coefficient Ay, and a line-of-sight correction coefficient By, which are stored in the memory section 4. The line-of-sight correction coefficients Ax to By are coefficients for correcting an individual difference in the line of sight of the user, and are determined by calibration (correction), described hereinafter.

In a step S007, the CPU 3 estimates (calculates) a position of the line of sight of the user on the display device 10, i.e. a position of a point at which the user gazes (hereinafter referred to as the "gaze point") using the rotational angle θx and the rotational angle θy. Assuming that the gaze point is represented by coordinates (Hx, Hy) corresponding to the center 141c of the pupil 141 on the display device 10, the coordinate Hx is calculated by the following equation (2), and the coordinate Hy is calculated by the following equation (3):

$$Hx = m \times (Ax \times \theta x + Bx) \quad (2)$$

$$Hy = m \times (Ay \times \theta y + By) \quad (3)$$

Note that the coefficient m is a constant determined by the configuration of the viewfinder optical system of the camera 1, and is a conversion coefficient for converting the rotational angle θx and the rotational angle θy to position coordinates corresponding to the center 141c of the pupil 141 on the display device 10. The coefficient m is stored in the memory section 4 in advance. Further, as mentioned above, the line-of-sight correction coefficient Ax, the line-of-sight correction coefficient Bx, the line-of-sight correction coefficient Ay, and the line-of-sight correction coefficient By are for correcting an individual difference in the line of sight of the user, and are determined by calibration. It is assumed that the line-of-sight correction coefficients Ax to By are stored in the memory section 4 before the line-of-sight detection process is started. In a step S008, the CPU 3 stores the coordinates (Hx, Hy) in the memory section 4.

As described above, in the present embodiment, the CPU 3 functions as a gaze point position-estimating unit (estimation unit) configured to estimate a position corresponding to a user's gaze point on the display device 10 based on the image of the eyeball 14 captured by the eyeball image sensor 17 (estimation step). Note that in the camera 1, a CPU that functions as the gaze point position-estimating unit can be provided separately from the CPU 3.

As described above, in the line-of-sight detection process (line-of-sight detection routine), the rotational angle θx and the rotational angle θy of the eyeball 14 are determine from the eyeball image signals, and the gaze point position is estimated by executing calculation for converting the position of the pupil center 141c to coordinates of the corresponding position on the display device 10. Further, the shape of the eyeball 14 varies from an individual to an individual, and for example, in a case where such a factor exists, unless the values of the line-of-sight correction coefficient Ax, the line-of-sight correction coefficient Bx, the line-of-sight correction coefficient Ay, and the line-of-sight correction coefficient By are adjusted to proper values for each user, there is a possibility that there arises a state shown in FIG. 4B. In the state shown in FIG. 4B, an estimated gaze point C deviates from a gaze point (actual gaze point) B at which the user is actually gazing. In this case, although the user desires to gaze at a person at the gaze point B, the camera 1 erroneously estimates that the user is gazing at the background, and the proper focus detection and sufficient adjustment cannot performed. To avoid this, it is preferable to execute calibration for determining proper values of the correction coefficients before image capturing is performed by the camera 1.

In the calibration, first, a plurality (first number) of first indicators to be visually recognized by the user are displayed on the display device 10. Then, line-of-sight estimation is performed whenever the user visually recognizes (gazes at) the first indicators one by one. The CPU 3 determines the line-of-sight correction coefficients Ax to By based on a positional relationship between each first indicator on the display device 10 and an estimated gaze point estimated when the user visually recognizes each first indicator. For example, as shown in FIG. 4C, a first indicator (c)-L, a first indicator (c)-R, a first indicator (c)-T, and a first indicator (c)-B are displayed on the display device 10. The first indicator (c)-L is disposed at a location biased toward a left periphery of the display device 10 (display screen) in a central portion in the vertical direction (upper-lower direction). The first indicator (c)-R is disposed at a location biased toward a right periphery of the display device 10 in the central portion in the vertical direction. The first indicator (c)-T is disposed at a location biased toward an upper periphery of the display device 10 in a central portion in the lateral direction (right-left direction). The first indicator (c)-B is at a location biased toward a lower periphery of the display device 10 in the central portion in the lateral direction. When the user visually recognizes the first indicator (c)-L, an estimated gaze point corresponding to the first indicator (c)-L is detected, and when the user visually recognizes the first indicator (c)-R, an estimated gaze point corresponding to the first indicator (c)-R is detected. Then, the line-of-sight correction coefficient Ax and the line-of-sight correction coefficient Bx are calculated from results of these detections.

More specifically, the X-coordinate of the first indicator (c)-L on the display device 10 is represented by Hx1, the X-coordinate of the first indicator (c)-R is represented by Hx2, the rotational angle of the eyeball 14 at the time of gazing at the first indicator (c)-L is represented by θx1, and the rotational angle of the eyeball 14 at the time of gazing at the first indicator (c)-R is represented by θx2. Note that it is preferable that the rotational angle θx1 and the rotational angle θx2 are each a value in which variation and noise are taken into account, such as an averaged value, a median, or the like, of a plurality of determined values of an associated one of the rotational angles. The value Hx1 is calculated by the following equation (4), and the value Hx2 is calculated by the following equation (5):

$$Hx1 = m \times (Ax \times \theta x1 + Bx) \quad (4)$$

$$Hx2 = m \times (Ax \times \theta x2 + Bx) \quad (5)$$

The line-of-sight correction coefficient Ax and the line-of-sight correction coefficient Bx can be determined by the equations (4) and (5). Further, similar to this, the line-of-sight correction coefficient Ay and the line-of-sight correction coefficient By can also be determined by using the first indicator (c)-T and the first indicator (c)-B. The line-of-sight correction coefficients Ax to By are stored in the memory section 4 as first correction information. In the camera 1, by executing the first calibration using the first correction information, i.e. the first correction (correction in a first mode), the gaze point B at which the user is actually gazing and the estimated gaze point C are made to coincide with each other. That is, it is possible to accurately estimate the gaze point position of the user on the display device 10. Note that although the number of displayed first indicators is set to four in the present embodiment, this is not limitative, but for example, it is preferable to set the number of first indicators to a number from two to eight, and more preferable to set the same to a number from four or five. With this, it is possible to accurately determine the line-of-sight correction coefficients as the first correction information. As the shape of the first indicator, although the frame shape is used in the present embodiment, this is not limitative, but for example, a dot shape or the like may be used. Further, in the present embodiment, the CPU 3 also functions as a correction unit configured to correct a position on the display device 10, which corresponds to the gaze point. This correction is performed based on the positions of the indicators displayed on the display device 10 and the positions corresponding to the user's gaze points and associated with these positions of the indicators. Note that in the camera 1, a CPU that functions as the correction unit can be provided separately from the CPU 3.

As described above, by performing the first correction using the first correction information, it is possible to accurately estimate the user's gaze point position on the display device 10. However, in a case where the user's eye-contact position with respect to the eyepiece lens 12 changes e.g. due to a change in the posture of the user, the first correction information cannot be always used as it is, for detection of the line of sight after the change. For example, let us consider a case where, as the eye-contact position, there are a first eye-contact position where the user's eye is brought into contact with the eyepiece lens 12 when determining the first correction information (performing the first correction using the first correction information) and a second eye-contact position which is different from the first eye-contact position. The first correction information is determined at the first eye-contact position, and hence if the first correction information is used as it is, for detection of a line of sight at the second eye-contact position, there is a possibility that it is difficult to accurately detect a line of sight. For this reason, unless whenever the eye-contact position changes, photographing is interrupted and calibration is executed for each eye-contact position to determine correction information, it is presumed that the accuracy of estimation of the gaze point position is insufficient. In this case, calibration (hereinafter referred to as the "normal calibration") is frequently executed, which makes the control by the CPU 3 troublesome. In view of this inconvenience, the camera 1 is configured to be capable of executing calibration in which this troublesomeness of the control is reduced (hereinafter referred to as the "calibration on an eye contact basis"). The configuration and the action of the calibration on an eye contact basis will be described below.

In the camera 1, contact of an eye with the eyepiece lens 12 is detected based on whether or not an eyeball image is captured by the eyeball image sensor 17. Therefore, the eyeball image sensor 17 also functions as an eye-contact detection unit configured to detect contact of an eye with the eyepiece lens 12. Then, in a case where the contact of an eye with the eyepiece lens 12 is detected, the CPU 3 performs correction (second correction using second correction information, described hereinafter) by executing the calibration on an eye contact basis. Further, in the camera 1, it is also possible to detect an eye-contact position of a user with respect to the eyepiece lens 12 according to a position of an eyeball image captured by the eyeball image sensor 17. Therefore, the eyeball image sensor 17 also functions as an eye-contact position detection unit that is capable of detecting the first eye-contact position and the second eye-contact position. Then, in a case where the second eye-contact position different from the first eye-contact position is detected, the CPU 3 can perform correction by executing the calibration on an eye contact basis.

To consider a relationship between a change in gaze point position generated due to a change in eye-contact position and the above-described method of calculating the gaze point position, the equation (2) is transformed into the following equation (6), and the equation (3) is transformed into the following equation (7):

$$Hx/m = Ax \times \theta x + Bx \quad (6)$$

$$Hy/m = Ay \times \theta y + By \quad (7)$$

Here, it is clear that Hx/m represents the rotational angle θx after correction and is calculated as a linear function using the detected rotational angle θx as a variable, the line-of-sight correction coefficient Ax as an inclination, and the line-of-sight correction coefficient Bx as an intercept. Further, since the line-of-sight correction coefficient Ax is the inclination, the line-of-sight correction coefficient Ax can be calculated by the following equation (8):

$$Ax = \delta(Hx/m)/\delta\theta x \quad (8)$$

It is clear from the equations (6) and (8) that the line-of-sight correction coefficient Ax is a correction coefficient with respect to the displacement amount (unit change amount) of the detected rotational angle θx, and the line-of-sight correction coefficient Bx is a correction coefficient with respect to the relative position of the detected rotational angle θx. Further, the line-of-sight correction coefficient Ay and the line-of-sight correction coefficient By can be considered similarly.

Incidentally, the change in gaze point position due to a change in eye-contact position refers to relative changes in the detected rotational angles θx and θy. When this is considered in combination with the above-mentioned meaning of each line-of-sight correction coefficient, the calibration on an eye contact basis is only required to determine (calculate) only the line-of-sight correction coefficient Bx and the line-of-sight correction coefficient By. That is, even when the eye-contact position changes, the rotational angles θx and θy hardly change (can be ignored), and hence although it is unnecessary to newly calculate the line-of-sight correction coefficients Ax and Ay, the amount of change in the eye-contact position is only required to be adjusted by the line-of-sight correction coefficients Bx and By. Therefore, only the line-of-sight correction coefficients Bx and By are required to be determined by the calibration on an eye contact basis. With this, in the calibration on an eye contact basis, for the line-of-sight correction coefficients Ax and Ay, corresponding line-of-sight correction coefficients determined by the normal calibration can be used as they are, and for the line-of-sight correction coefficients Bx and By, newly determined line-of-sight correction coefficients are used.

Figure 8A:
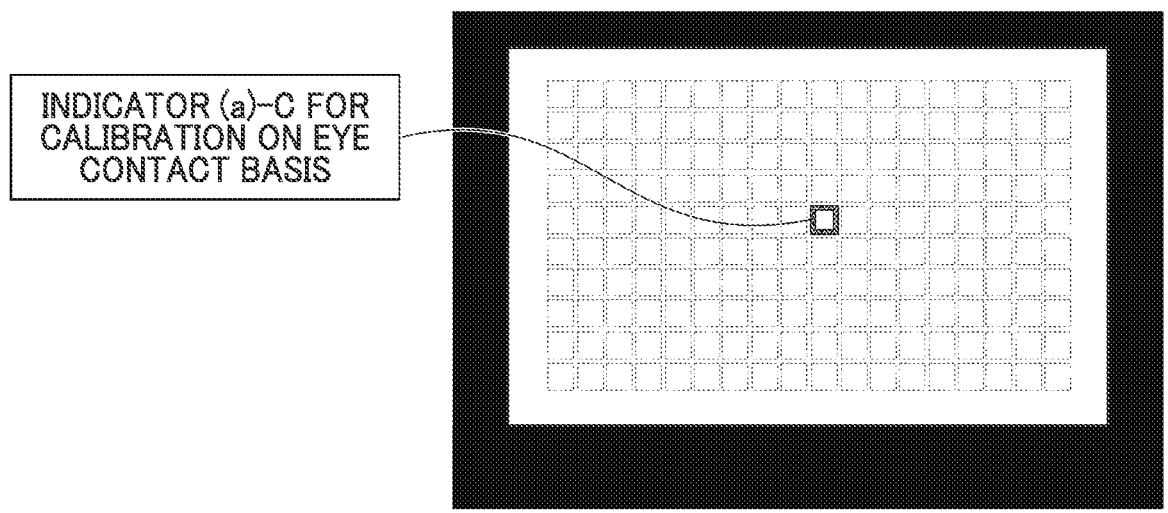
FIGS. 8A and 8B are diagrams each showing an in-finder field (image displaying state of the display device).
Figure 8B:
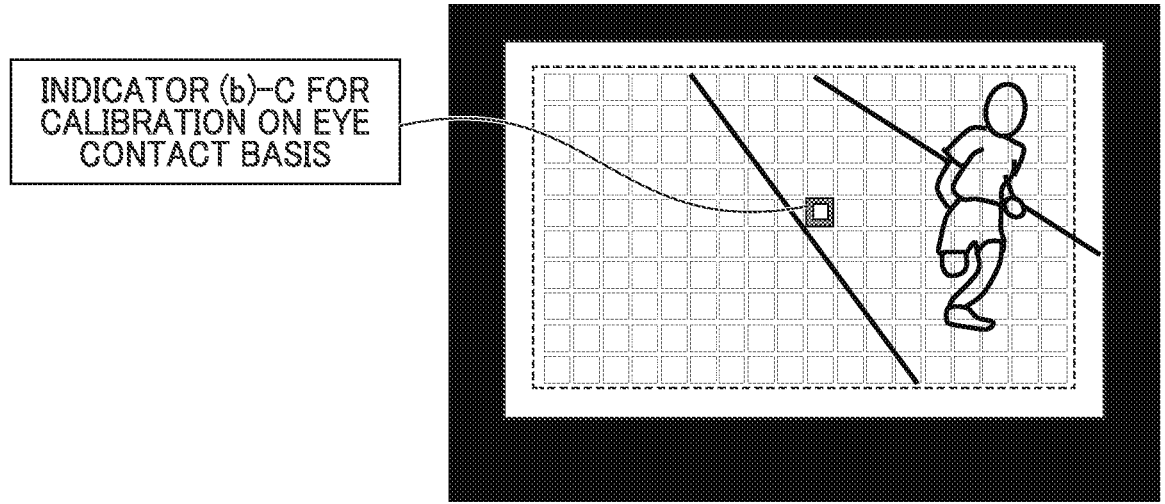

As described above, in the calibration on an eye contact basis, since only the line-of-sight correction coefficients Bx and By are calculated, it is preferable that the normal calibration has been executed in advance. Here, a description will be given of an example of executing the calibration on an eye contact basis after executing the normal calibration. FIGS. 8A and 8B are diagrams each showing an in-finder field (image displaying state of the display device).

In the calibration on an eye contact basis, first, second indicators to be visually recognized by the user is displayed on the display device 10. The number (second number) of second indicators to be displayed may be less than the number (first number) of first indicators to be displayed. For example, as shown in FIG. 8A, a second indicator (a)-C is displayed on the display device 10. The second indicator (a)-C is disposed in a central portion on the display device 10 (display screen). Then, when the user visually recognizes the second indicator (a)-C, an estimated gaze point corresponding to the second indicator (a)-C is detected. In this detection, although it is preferable to substitute a value of "0" into the line-of-sight correction coefficients Bx and By without using the values stored in the memory section 4, this is not limitative. For example, values determined by combining line-of-sight correction coefficients calculated in the calibration on an eye contact basis, described hereinafter, and the values stored in the memory section 4, respectively, may be used. Then, the line-of-sight correction coefficient Bx and the line-of-sight correction coefficient By are determined from the position (coordinates) of the estimated gaze point corresponding to the second indicator (a)-C.

More specifically, it is assumed that the coordinates of the second indicator (a)-C on the display device 10 are represented by (Hx3, Hy3), and the rotational angles of the eyeball 14 at the time of gazing at the second indicator (a)-C are represented by θx3 and θy3. Note that it is preferable that the rotational angle θx3 and the rotational angle θy3 are each a value in which variation and noise are taken into account, such as an averaged value, a median, or the like, of a plurality of determined values of an associated one of the rotational angles. The value Hx3 is calculated by the following equation (9), and the value Hy3 is calculated by the following equation (10):

$$Hx3=m\times(Ax\times\theta x3+Bx) \quad (9)$$

$$Hy3=m\times(Ay\times\theta y3+By) \quad (10)$$

Since the line-of-sight correction coefficients Ax and Ay have already been calculated by the normal calibration, the line-of-sight correction coefficient Bx and the line-of-sight correction coefficient By can be calculated by the equations (9) and (10). The line-of-sight correction coefficient Bx and the line-of-sight correction coefficient By are stored in the memory section 4 as the second correction information. In the camera 1, even when the eye-contact position changes, it is possible to accurately estimate the gaze point position of the user on the display device 10 (display unit) by executing the second calibration using the second correction information, i.e. the second correction (in a second mode) for each eye contact. Note that in the camera 1, the first correction and the second correction are performed in the mentioned order. Further, in the calibration on an eye contact basis, the number of line-of-sight correction coefficients to be calculated is smaller than the number of line-of-sight correction coefficients to be calculated in the normal calibration, which can reduce the troublesomeness of the control by the CPU 3.

As described above, the second correction information is formed by causing the information (the line-of-sight correction coefficient Bx and the line-of-sight correction coefficient By) determined based on the positional relationship between the second indicator on the display device 10 and the gaze point estimated by the CPU 3 at the time of visual recognition of the second indicator to be reflected on the first correction information. Further, in the camera 1, when correcting the gaze point position, whether to perform the first correction using the first correction information or the second correction using the second correction information can be selected. With this, it is possible to quickly and easily reduce the positional deviation of the gaze point occurring on an eye contact basis. Further, whether to perform the first correction or perform the second correction using the second correction information is selected not by a user's manual operation, but by the CPU 3. This improves the convenience of photographing.

Note that although the number of second indicators to be displayed is one in the present embodiment, the number of second indicators is only required to be less than the number of first indicators to be displayed, and for example, the number of second indicators is preferably a number from one to four, and more preferably one or two. This makes it possible to accurately determine each line-of-sight correction coefficient as the second correction information. Further, in a case where the number of second indicators to be displayed is plural, similar to the case where the number of second indicators to be displayed is one, it is preferable that the second indicators are positioned toward the central portion of the display device 10.

As shown in FIG. 8B, a second indicator (b)-C for the calibration on an eye contact basis is displayed on the display device 10 in a state superimposed on the through image output from the image sensor 2. With this, even when photographing is being performed, it is possible to execute the calibration on an eye contact basis without stopping or interrupting photographing, which improves the convenience of photographing. Further, in the camera 1, a shortcut function which can instruct start/interruption of the calibration on an eye contact basis may be assigned e.g. to the operation member 42 (see FIG. 1C). In this case, for example, when the operation member 42 is tilted to the left (see the center figure in FIG. 1C), the calibration on an eye contact basis is started, and when the operation member 42 is tilted to the right (see the right figure in FIG. 1C), the calibration on an eye contact basis is interrupted. This makes it possible to quickly start or interrupt the calibration on an eye contact basis as required. Further, the calibration on an eye contact basis may also be interrupted by operating the release button 5. With this, in a case where a shutter-release opportunity arises when calibration on an eye contact basis is being executed during photographing, it is possible to quickly interrupt the calibration and start the release operation by pressing the release button 5.

Figure 9:
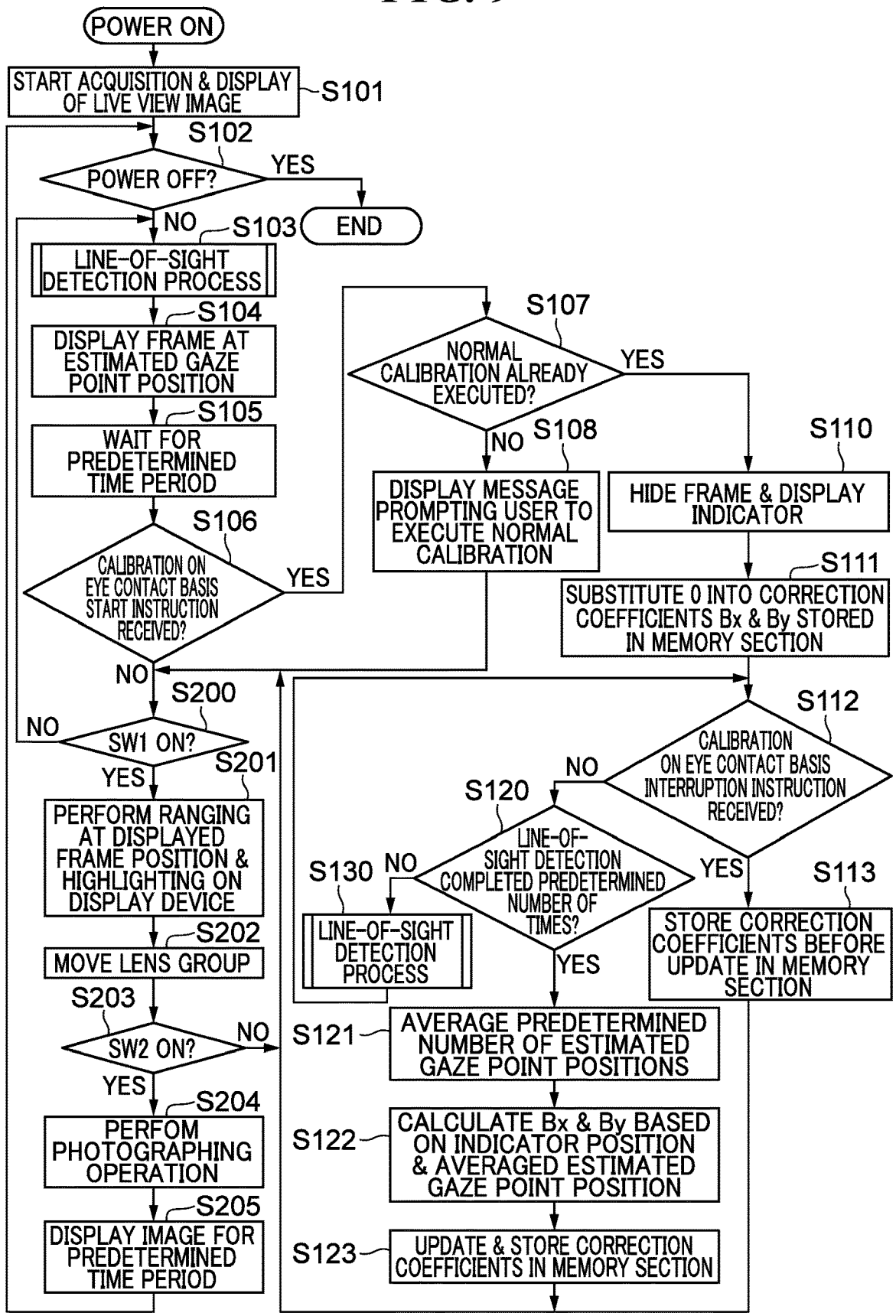
FIG. 9 is a flowchart of a process for switching between first correction and second correction in a first embodiment.

FIG. 9 is a flowchart of a process for switching between the first correction and the second correction in the first embodiment. When the camera 1 has been powered on and the present process is started, in a step S101, the CPU 3 causes the image sensor 2 to start acquisition of a live view image and send image signals of the live view image to the CPU 3. Further, the CPU 3 causes the live view image received from the image sensor 2 to be displayed on the display device 10. The user can visually recognize an object in the live view image displayed on the display device 10. In a step S102, the CPU 3 determines whether or not the power has been turned off. If it is determined by the CPU 3 in the step S102 that the power has been turned off, the present process is immediately terminated. On the other hand, if it is determined by the CPU 3 in the step S102 that the power has not been turned off, the process proceeds to a step S103. In the step S103, the CPU 3 causes the eyeball image sensor 17 to operate to acquire an eyeball image of the user who has started to visually recognize the object in the step S101, and performs the above-described line-of-sight detection process. In the present embodiment, the coordinates (Hx, Hy) of the estimated gaze point on the display device 10 are determined by the line-of-sight detection process in FIG. 7. In a step S104, the CPU 3 causes the display device 10 to operate to display an image generated by superimposing the estimated gaze point at the coordinates (Hx, Hy) determined in the step S103 on the live view image. At this time, it is assumed that the user is visually recognizing e.g. the image in the state shown in FIG. 4B within the viewfinder. Then, the current estimated gaze point C displayed in a state superimposed on the live view image is notified from the camera 1 to the user. In a step S105, the CPU 3 waits for a predetermined time period.

In a step S106, the CPU 3 determines whether or not an instruction for starting the calibration on an eye contact basis has been received from the user. If it is determined by the CPU 3 in the step S106 that the instruction for starting the calibration on an eye contact basis has been received from the user, the process proceeds to a step S107. On the other hand, if it is determined by the CPU 3 in the step S106 that the instruction for starting the calibration on an eye contact basis has not been received from the user, the process proceeds to a step S200. As described above, the instruction for starting the calibration on an eye contact basis can be provided by operating the operation member 42. In the step S107, the CPU 3 determines whether or not the normal calibration has been executed. If it is determined by the CPU 3 in the step S107 that the normal calibration has been executed, the process proceeds to a step S110. On the other hand, if it is determined by the CPU 3 in the step S107 that the normal calibration has not been executed, the process proceeds to a step S108 without starting the calibration on an eye contact basis. In the step S108, the CPU 3 displays, for example, a message prompting the user to execute the normal calibration, on the display device 10. After execution of the step S108, the process proceeds to the step S200.

In the step S110, the CPU 3 hides the estimated gaze point C displayed on the display device 10 and displays the second indicator (b)-C for the calibration on an eye contact basis, as shown in FIG. 8B, in a state superimposed on the live view image on the display device 10. In a step S111, the CPU 3 reads line-of-sight correction coefficients Ax to By stored in association with the user from the memory section 4 where the line-of-sight correction coefficients Ax to By are stored on a user-by-user basis, and stores coefficients updated by substituting "0" into the line-of-sight correction coefficient Bx and the line-of-sight correction coefficient By in the memory section 4. In a step S112, the CPU 3 determines whether or not an instruction for stopping the calibration on an eye contact basis has been received from the user. If it is determined by the CPU 3 in the step S112 that the instruction for stopping the calibration on an eye contact basis has been received from the user, the process proceeds to a step S113. On the other hand, if it is determined by the CPU 3 in the step S112 that the instruction for stopping the calibration on an eye contact basis has not been received from the user, the process proceeds to a step S120. As described above, the instruction for stopping the calibration on an eye contact basis can be provided by operating the operation member 42 or pressing the release button 5. In the step S113, the CPU 3 stores the line-of-sight correction coefficients Ax, Bx, Ay, and By before updated in the step S111 in the memory section 4, and the process proceeds to the step S200.

In the step S120, the CPU 3 determines whether or not the line-of-sight detection in the step S103 has been completed a predetermined number of times. If it is determined by the CPU 3 in the step S120 that the line-of-sight detection has been completed the predetermined number of times, the process proceeds to a step S121. On the other hand, if it is determined by the CPU 3 in the step S120 that the line-of-sight detection has not been completed the predetermined number of times, the process proceeds to a step S130. In the step S130, the CPU 3 causes the eyeball image sensor 17 to acquire an eyeball image of the user gazing at the second indicator (b)-C displayed in the step S101, and performs the above-described line-of-sight detection process. In the present embodiment, by performing the line-of-sight detection process in FIG. 7, the coordinates (Hx, Hy) of the estimated gaze point on the display device 10 are determined. After execution of the step S130, the process returns to the step S112. In the step S121, the CPU 3 calculates an average of the predetermined number of values of each of the coordinates (Hx, Hy) of the estimated gaze point determined by the line-of-sight detection performed the predetermined number of times. In a step S122, the CPU 3 executes the calibration on an eye contact basis, using the averaged coordinates (Hx, Hy) of the estimated gaze point, which are calculated in the step S121, and the line-of-sight correction coefficients Ax and Ay acquired in the step S111. With this, the line-of-sight correction coefficient Bx and the line-of-sight correction coefficient By for the calibration on an eye contact basis are calculated. In a step S123, the CPU 3 stores the line-of-sight correction coefficients Ax and Ay which are read from the memory section 4 in the step S111 and the line-of-sight correction coefficients Bx and By which are calculated in the step S122, in the memory section 4. After execution of the step S123, the process proceeds to the step S200.

In the step S200, the CPU 3 determines whether or not the release button 5 has been pressed by the user to turn on the SW1. In a case where the user agrees to perform focusing at the position of the estimated gaze point displayed on the display device 10, the user can turn on the SW1 by pressing the release button 5. If it is determined by the CPU 3 in the step S200 that the SW1 has been turned on, the process proceeds to a step S201. On the other hand, if it is determined by the CPU 3 in the step S200 that the SW1 has not been turned on, the process returns to the step S103, and the CPU 3 performs the line-of-sight detection again. In the step S201, the CPU 3 executes the ranging operation at the current position of the estimated gaze point and displays information that the ranging operation is in progress, on the live view image on the display device 10. This enables the user to grasp that the ranging operation is being executed. Note that the ranging operation execution information can be displayed e.g. by changing the color of the estimated gaze point. In a step S202, the CPU 3 causes the lens focus adjustment circuit 118 to operate the lens driving member 114 to move the lens 101 to an in-focus position corresponding to a ranging result acquired in the step S201. In a step S203, the CPU 3 determines whether or not the release button 5 has been further pressed by the user to turn on the SW2. In a case where the user agrees to perform focusing at the estimated gaze point displayed on the display device 10, the user further presses the release button 5. With this, in the step S203, the CPU 3 can shift the SW2 to the ON state. If it is determined by the CPU 3 in the step S203 that the SW2 has been turned on, the process proceeds to a step S204. On the other hand, if it is determined by the CPU 3 in the step S203 that the SW2 has not been turned on, the process returns to the step S200, and the CPU 3 sequentially executes the steps subsequent thereto. In the step S204, the CPU 3 causes the image sensor 2 to operate to perform photographing. With this, the image sensor 2 acquires image signals. Further, these image signals are sent to the CPU 3 and stored in the memory section 4. After execution of the step S204, the process proceeds to a step S205. In the step S205, the CPU 3 displays the acquired image on the display device 10 e.g. for a predetermined time period, and then the process returns to the step S102 to cause the CPU 3 to sequentially executes the steps subsequent thereto.

As described above, in the camera 1, deviation of the gaze point position, which can occur on an eye contact basis, can be corrected without requiring the user to perform a troublesome operation. With this correction, the gaze point at which the user is actually gazing and the estimated gaze point are made to coincide with each other, whereby focusing is achieved at this gaze point, and photographing is performed. This improves the user's convenience of photographing.

A second embodiment will be described below with reference to FIG. 10. In the above-described first embodiment, even when image capturing is performed by placing a user's eye at an eye-contact position different from an eye-contact position at which the normal calibration has been executed, it is possible, by executing the calibration on an eye contact basis, to calculate proper line-of-sight correction coefficients at the eye-contact position at the time of performing the image capturing and thereby estimate the gaze point. Incidentally, in a case where there is a large difference between a first eye-contact distance at the time of executing the normal calibration (at the first eye-contact position) and a second eye-contact distance at the time of executing the calibration on an eye contact basis (at the second eye-contact position), it is sometimes preferable to execute the normal calibration again.

The "eye-contact distance" in the present embodiment refers to a distance (actual distance) between the light receiving lens 16 and the eyeball 14. This eye-contact distance and the imaging magnification β described in the first embodiment are generally in inverse proportional relation, and hence the eye-contact distance can be determined as a function of the imaging magnification β. Further, as described in the first embodiment, the imaging magnification β can be determined as a function of the distance (Xd−Xe) between the cornea reflection image Pd' and the cornea reflection image Pe', and hence the eye-contact distance can be similarly determined as a function of the distance (Xd−Xe).

In the present embodiment, the camera 1 is provided with an eye-contact distance detection unit configured to detect an eye-contact distance in a state in which the user's eye is in contact with the eyepiece lens 12. The eye-contact distance detection unit is not particularly limited, but, for example, an infrared distance sensor can be used. In a case where the eye-contact distance detection unit is implemented by using the infrared distance sensor, it is preferable that the infrared distance sensor is disposed e.g. between the light source 13a and the light source 13b. Further, the eye-contact distance detection unit is capable of detecting the first eye-contact distance and the second eye-contact distance.

In the camera 1, the CPU 3 calculates a difference between the first eye-contact distance and the second eye-contact distance, and if the difference is larger than a predetermined value, the CPU 3 determines that the normal calibration should be executed again. Then, the first correction information is acquired again by executing the normal calibration, and the first correction using the acquired first correction information is performed without performing the second correction. Note that the predetermined value is determined as follows: When the camera 1 is designed, the relationship between the difference between the eye-contact distances and the rate of concordance between an actual gaze point position and an estimated gaze point position is measured, and the predetermined value is determined such that the rate of the concordance becomes equal to or higher than a predetermined value. Then, this predetermined value is stored in the memory section 4 in advance. Note that the predetermined value is not limited to a uniquely determined value but it is preferable that the predetermined value is properly determined according to a variety of conditions. Further, a plurality of predetermined values which are different in magnitude may be stored in the memory section 4. This makes it possible to differentiate the calibration according to the magnitude of the difference between the eye-contact distances. For example, in a case where a first predetermined value and a second predetermined value smaller than the first predetermined value are provided, if the difference between the eye-contact distances is larger than the first predetermined value, it is determined that the normal calibration should be executed again. Further, if the difference between the eye-contact distances is equal to or smaller than the first predetermined value (equal to or smaller than the predetermined value) and larger than the second predetermined value, it is determined that the calibration on an eye contact basis should be executed to perform the second correction using this calibration on an eye contact basis. Further, if the difference between the eye-contact distances is equal to or smaller than the second predetermined value, it is determined that execution of the calibration is not required, and the line-of-sight correction coefficients stored in the memory section 4 are used as they are.

Figure 10:
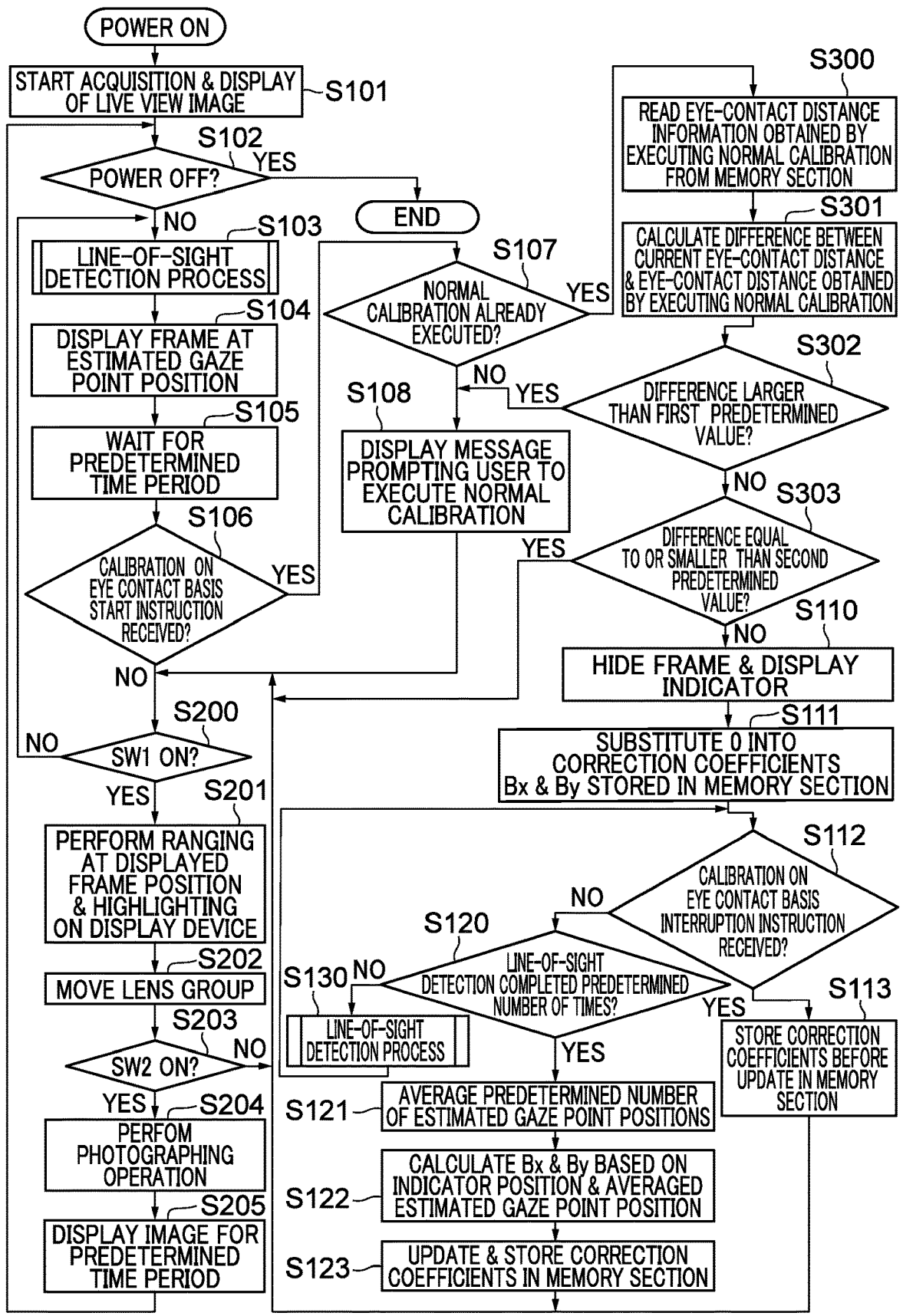
FIG. 10 is a flowchart of a process for switching between first correction and second correction in a second embodiment.

FIG. 10 is a flowchart of a process for switching between the first correction and the second correction in the second embodiment. The switching process in FIG. 10 differs from the switching process in FIG. 9 in that steps S300 to S303 are added, and the other steps are the same as in the switching process in FIG. 9. The following description will be given of the steps S300 to S303 and the step S107 related to these steps, and the description of the same steps as those in the switching process in FIG. 9 is omitted.

In the step S107, the CPU 3 determines whether or not the normal calibration has been executed. If it is determined by the CPU 3 in the step S107 that the normal calibration has been executed, the process proceeds to the step S300. On the other hand, if it is determined in the step S107 that the normal calibration has not been executed, the process proceeds to the step S108 without starting the calibration on an eye contact basis.

In the step S300, the CPU 3 reads the first eye-contact distance which is eye-contact distance information stored in the memory section 4. In the step S301, the CPU 3 calculates a difference between the second eye-contact distance information which is the current eye-contact distance determined in the step S103 and the first eye-contact distance acquired in the step S300. In the step S302, the CPU 3 determines whether or not the difference is larger than the first predetermined value. If it is determined by the CPU 3 in the step S302 that the difference is larger than the first predetermined value, the process proceeds to the step S108. On the other hand, if it is determined by the CPU 3 in the step S302 that the difference is equal to or smaller than the first predetermined value, the process proceeds to a step S303. In the step S303, the CPU 3 determines whether or not the difference is equal to or smaller than the second predetermined value. If it is determined by the CPU 3 in the step S303 that the difference is equal to or smaller than the second predetermined value, the process proceeds to the step S200. On the other hand, if it is determined by the CPU 3 in the step S303 that the difference is larger than the second predetermined value, the process proceeds to the step S110. In this case, since the normal calibration has already been executed, it is determined that execution of the calibration is not required, and hence the line-of-sight correction coefficients (first correction information) stored in the memory section 4 are read out and used as they are.

According to the above-described process, it is possible to properly select the normal calibration or the calibration on an eye contact basis according to the magnitude of the eye-contact distance, which improves the convenience of photographing.

A third embodiment will be described below with reference to FIG. 11. In the second embodiment, in a case where the eye-contact distance is different for each eye contact, the normal calibration or the calibration on an eye contact basis is executed according to the magnitude of the eye-contact distance, whereby it is possible to determine proper line-of-sight correction coefficients and estimate the gaze point. Incidentally, to start the process for selecting proper calibration and calculating the line-of-sight correction coefficients again, the user's operation is required and this may be troublesome. The camera 1 is configured to be capable of detecting contact of a user's eye. In the present embodiment, in a case where eye contact is detected, it is possible to automatically start the process for selecting proper calibration and calculating the line-of-sight correction coefficients again, as described in the second embodiment.

In the present embodiment, the line-of-sight detection is periodically executed even in a non-eye-contact state, and in a case where detection of a gaze point is successful, it is determined that the user is in the eye-contact state, and in a case where no gaze point is detected, it is determined that the non-eye-contact state continues. Further, the configuration for detecting eye contact is not limited to one that uniquely determines eye contact, but it is preferable that the detection of eye contact is properly determined according to a variety of conditions. For example, eye-contact detection may be performed by using e.g. a proximity sensor.

Figure 11:
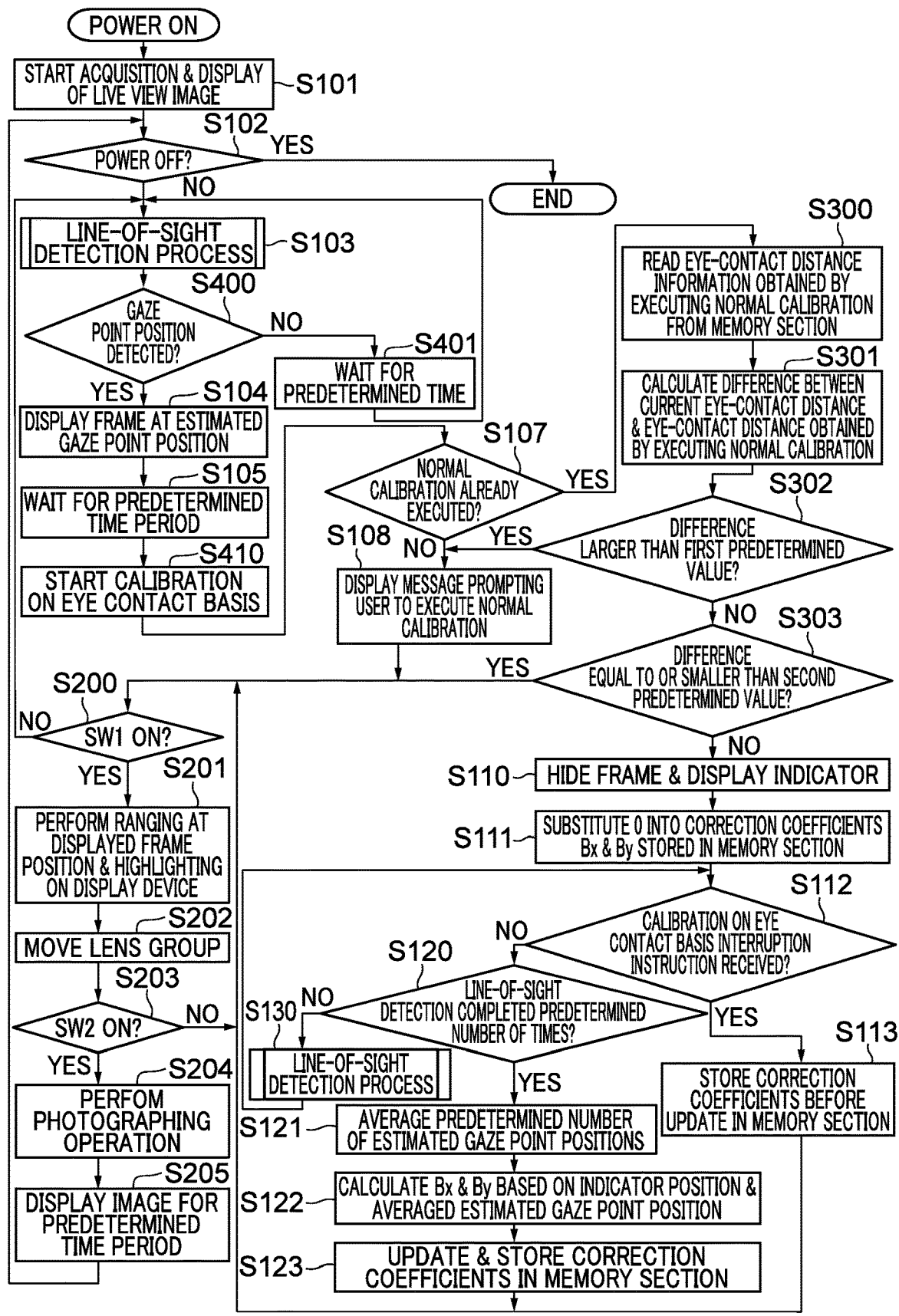
FIG. 11 is a flowchart of a process for switching between first correction and second correction in a third embodiment.

FIG. 11 is a flowchart of a process for switching between the first correction and the second correction in the third embodiment. The switching process in FIG. 11 differs from the switching process in FIG. 10 in that steps S400 and S401 are added, the step S106 is replaced by a step S410, and the other steps are the same as in the switching process in FIG. 10. The following description will be given of the steps S400, S401, and S410, and the steps S103 to S105 related to these steps, and the description of the same steps as those in the switching process in FIG. 10 is omitted.

In the step S103, the CPU 3 causes the eyeball image sensor 17 to operate to acquire an eyeball image of the user who has started to visually recognize the object in the step S101. After acquisition of this image, the CPU 3 performs the above-described line-of-sight detection process. In the present embodiment, the coordinates (Hx, Hy) of the estimated gaze point on the display device 10 are acquired by the line-of-sight detection process in FIG. 7. After execution of the step S103, the process proceeds to the step S400.

In the step S400, the CPU 3 determines whether or not acquisition of the coordinates (Hx, Hy) of the estimated gaze point in the step S103 is successful. If it is determined by the CPU 3 in the step S400 that acquisition of the coordinates (Hx, Hy) is successful, the process proceed to the step S104. On the other hand, if it is determined by the CPU 3 in the step S400 that acquisition of the coordinates (Hx, Hy) of the estimated gaze point has failed, it is determined that the user is in the non-eye-contact state, and the process proceed to the step S401. In the step S401, the CPU 3 waits for a predetermined time period, and then the process returns to the step S103 for the CPU 3 to execute the following steps. In the steps S104 and S105, the same processing operations as in the steps S104 and S105 in the switching process in FIG. 10 are executed. After the step S105 is executed, the process proceeds to the step S410. In the step S410, the calibration on an eye contact basis is automatically started by the CPU 3, and the process proceeds to the step S107.

According to the above-described process, in a case where eye contact is detected, it is possible to automatically start the process for selecting proper calibration and calculating the line-of-sight correction coefficients again.

A fourth embodiment will be described below with reference to FIG. 12. In the third embodiment, it is possible to automatically execute calibration and calculate the line-of-sight correction coefficients in a case where eye contact is detected. Incidentally, as described in the first embodiment, the aim of calibration is to correct an individual difference of a user. Here, let us consider a case where a user (hereinafter referred to as the "first user") who has executed calibration and a user (hereinafter referred to as the "second user") who is different from the first user use the camera 1 shared between them. In this case, according to the configuration of the third embodiment, calibration is also automatically executed for the second user.

To avoid this, the camera 1 according to the present embodiment is provided with an iris information acquisition unit configured to acquire iris information concerning an iris of a user, and a matching degree detection unit configured to detect a matching degree between a plurality of iris information items based on a result of acquisition by the iris information acquisition unit. Note that in the present embodiment, the eyeball image sensor 17 functions as the iris information acquisition unit, and the CPU 3 functions as the matching degree detection unit.

In the present embodiment, when calibration is executed, the iris information is also stored in the memory section 4 together with the line-of-sight correction coefficients and the eye-contact distance information. In the present embodiment, the iris information includes first iris information and second iris information which is different from the first iris information, and both of these are iris images each obtained by extracting an iris portion from the eyeball image obtained by the above-described line-of-sight detection. Note that the iris information is not limited to uniquely determined information but it is preferable that the iris information is properly determined according to a variety of conditions. As the iris information, there may be used, for example, an image expanded/compressed by convolution integration, an image subjected to digital filtering, feature amounts determined by dividing an image into areas, or the like.

Further, a matching degree between the two iris information items i.e. the first iris information and the second iris information, which are acquired by the above-described method, is calculated by the matching degree detection unit. The matching degree calculation method is not particularly limited, but for example, the SAD (Sum of Absolute Difference) method can be used. The SAD is the sum of absolute values of differences, and hence as the matching degree between the two iris information items is higher, the evaluation value is smaller, so that the minimum value is equal to 0, and the maximum value is equal to the total sum of the values of one of the iris information items. Note that the matching degree calculation method is not uniquely determined, but it is preferable that the matching degree calculation method is determined according to a variety of conditions, such as a form of the iris information and a method of capturing an eyeball image. Then, in a case where the evaluation value of the first iris information and the second iris information is smaller than a predetermined value stored in the memory section 4 in advance, it can be determined that the two irises are an iris of the same person. Note that the predetermined value is preferably determined based on the sufficient number of samples of irises, more specifically, the iris information items obtained under a variety of conditions, such as the number of persons, eyeball angles, iris colors, and value of brightness at the time of eyeball image capturing.

Figure 12:
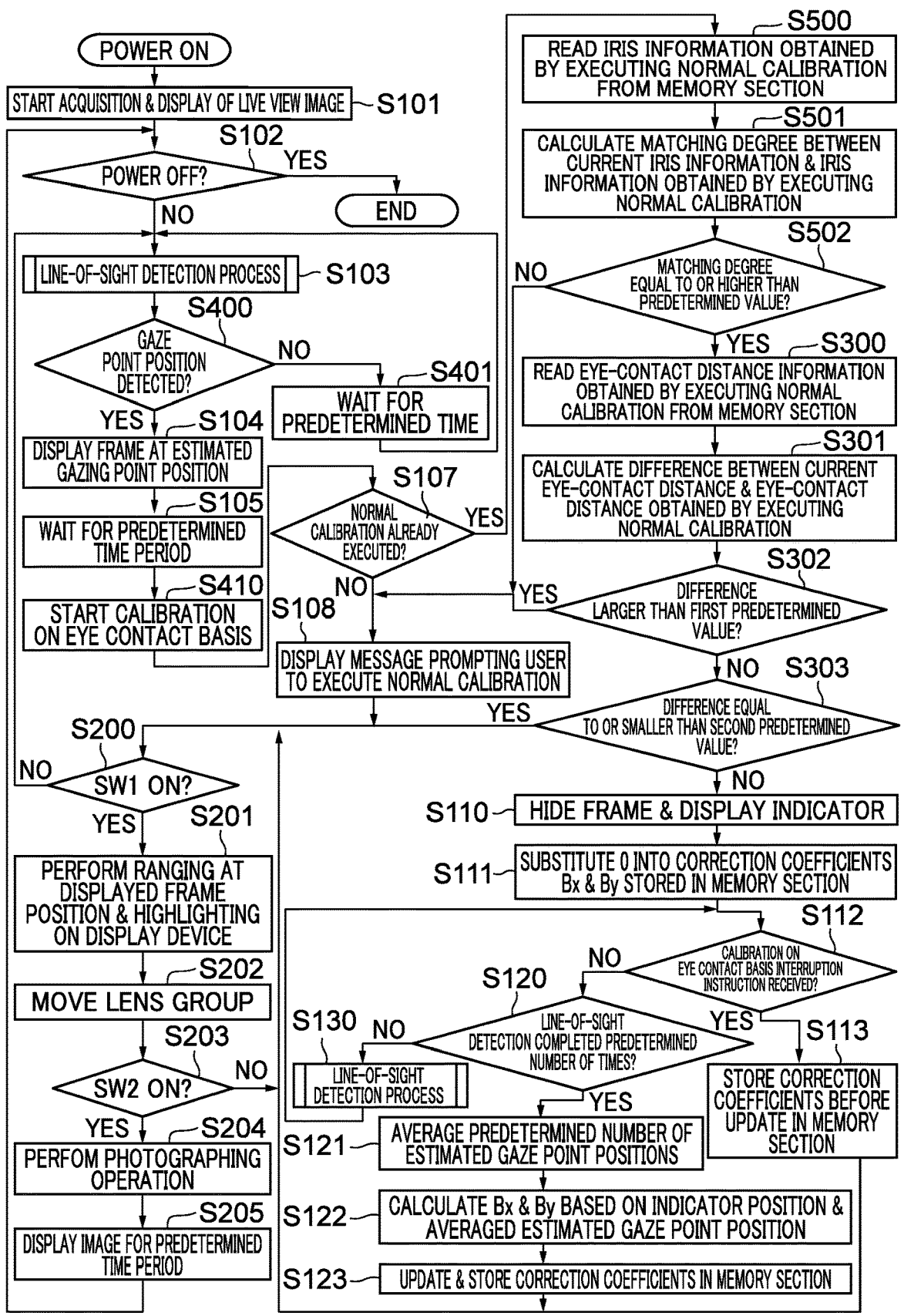
FIG. 12 is a flowchart of a process for switching between first correction and second correction in a fourth embodiment.

FIG. 12 is a flowchart of a process for switching between the first correction and the second correction in the fourth embodiment. The switching process in FIG. 12 differs from the switching process in FIG. 11 in that steps S500 to S502 are added, and the other steps are the same as in the switching process in FIG. 11. The following description will be given of the steps S500 to S502 and the step S107 related to these steps, and the description of the same steps as those in the switching process in FIG. 11 is omitted.

In the step S107, the CPU 3 determines whether or not the normal calibration has been executed. If it is determined by the CPU 3 in the step S107 that the normal calibration has been executed, the process proceeds to the step S500. On the other hand, if it is determined by the CPU 3 in the step S107 that the normal calibration has not been executed, the process proceeds to the step S108 without starting the calibration on an eye contact basis.

In the step S500, the CPU 3 reads the iris information stored in the memory section 4. The iris information refers to iris information obtained when the normal calibration has been executed as described above. In the step S501, the CPU 3 calculates the matching degree between the current iris information acquired in the step S103 and the iris information acquired in the step S500. In a case where the above-mentioned SAD method is used for calculation of the matching degree, as the evaluation value is smaller, the matching degree between the two iris information items becomes higher. In the step S502, the CPU 3 determines whether or not the evaluation value is equal to or smaller than a predetermined value, i.e. the matching degree between the first iris information and the second iris information is equal to or higher than a predetermined value. If it is determined by the CPU 3 in the step S502 that the matching degree is equal to or higher than the predetermined value, the process proceeds to the step S300. On the other hand, if it is determined by the CPU 3 in the step S502 that the matching degree is lower than the predetermined value, the process returns to the step S108, and the CPU 2 sequentially executes the following steps.

According to the above-described configuration, in a case where a user who executed calibration and a user whose eye is brought into contact with the eyepiece thereafter are the same person, the process described in the third embodiment can be automatically started. Further, in the present embodiment, it is possible to perform the second correction if it is determined that the matching degree between the first iris information and the second iris information is equal to or higher than the predetermined value, and perform the first correction without performing the second correction if it is determined that the above-mentioned matching degree is lower than the predetermined value. With this, it is possible to properly switch calibration according to a user, which contribute to high-accuracy estimation of a gaze point.

Although the description is given of the preferred embodiments of the present invention, the calibration for line-of-sight detection can be applied not only to the above-described camera, but also to a head mounting display, see-through glasses, an in-vehicle camera, for example.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-198715 filed Dec. 7, 2021, which is hereby incorporated by reference herein in its entirety.

What is claimed is:

1. A control apparatus comprising:
at least one processor; and
a memory coupled to the at least one processor, the memory having instructions that, when executed by the processor, perform the operations as:
an estimation unit configured to estimate a position corresponding to a gaze point of a user; and
a correction unit configured to correct the position corresponding to the gaze point of the user, based on a position of an indicator displayed on a display section and the position corresponding to the gaze point of the user and associated with the position of the indicator,
wherein the correction unit has a first mode for performing the correction based on positions of a first number of indicators and a second mode for performing the correction based on a second number, smaller than the first number, of indicators.

2. The control apparatus according to claim 1, wherein the correction unit performs the correction in an order of the first mode and the second mode.

3. The control apparatus according to claim 1, further comprising:
an eyepiece portion with which an eye of the user is brought into contact when the user views the display section, and
an eye-contact detection unit configured to detect contact of an eye with the eyepiece portion, and
wherein in a case where the contact of an eye is detected by the eye-contact detection unit, the correction unit performs the correction.

4. The control apparatus according to claim 1, wherein in the first mode, the correction unit displays the first number of indicators on the display section and uses first correction information obtained based on a positional relationship between each of the first number of indicators on the display section and a position corresponding to the gaze point, estimated by the estimation unit when the user visually recognizes each of the first number of indicators, and in the second mode, the correction unit displays the second number of indicators on the display section and uses second correction information generated by reflecting information obtained based on a positional relationship between each of the second number of indicators on the display section and a position corresponding to the gaze point, estimated by the estimation unit when the user visually recognizes each of the second number of indicators, on the first correction information.

5. The control apparatus according to claim 4, further comprising:
an eyepiece portion with which an eye of the user is brought into contact when the user views the display section, and
an eye-contact position detection unit configured to detect an eye-contact position of the eyepiece portion where the eye of the user is brought into contact, and
wherein as the eye-contact position, the eye-contact position detection unit can detect a first eye-contact position where the eye of the user is brought into contact when first correction using the first correction information is performed and a second eye-contact position which is different from the first eye-contact position, and
wherein in a case where the second eye-contact position is detected by the eye-contact position detection unit, the correction unit performs second correction using the second correction information.

6. The control apparatus according to claim 5, further comprising an eye-contact distance detection unit configured to detect an eye-contact distance in a state in which the eye of the user is in contact with the eyepiece portion, and
wherein the eye-contact distance detection unit can detect a first eye-contact distance at the first eye-contact position and a second eye-contact distance at the second eye-contact position, and
wherein in a case where a difference between the first eye-contact distance and the second eye-contact distance is larger than a first predetermined value, the correction unit performs the first correction without performing the second correction.

7. The control apparatus according to claim 6, wherein in a case where the difference between the first eye-contact distance and the second eye-contact distance is equal to or smaller than a second predetermined value which is smaller than the first predetermined value, the correction unit uses the first correction information already obtained, when performing the first correction.

8. The control apparatus according to claim 6, wherein in a case where the difference between the first eye-contact distance and the second eye-contact distance is equal to or smaller than the first predetermined value, the correction unit performs the second correction.

9. The control apparatus according to claim 5, wherein the memory having instructions that, when executed by the processor, perform the operations further as:
an iris information acquisition unit configured to acquire iris information associated with an iris of the user; and
a matching degree detection unit configured to detect a matching degree between a plurality of items of the iris information, and
wherein as the iris information, the iris information acquisition unit can detect first iris information and second iris information which is different from the first iris information, and
wherein the correction unit performs the second correction in a case where the matching degree between the first iris information and the second iris information detected by the matching degree detection unit is equal to or higher than a predetermined value, and performs the first correction without performing the second correction in a case where the matching degree detected by the matching degree detection unit is lower than the predetermined value.

10. The control apparatus according to claim 1, wherein the display section has a display screen having a rectangular shape,
wherein the first number of indicators are disposed at respective locations biased toward a periphery of the display screen, and
wherein the second number of indicators are each disposed in a central portion of the display screen.

11. The control apparatus according to claim 1, wherein the first number is a number from two to eight, and
wherein the second number is a number from one to four.

12. The control apparatus according to claim 1, further comprising:
the display section,
an image capturing section configured to capture an image of an object, and
an eyeball image capturing section configured to capture an image of a eyeball of the user.

13. A method of controlling a control apparatus, comprising:

estimating a position corresponding to a gaze point of a user; and correcting the position corresponding to the gaze point of the user, based on a position of an indicator displayed on a display section and the position corresponding to the gaze point of the user and associated with the position of the indicator, wherein said correcting is performed in at least one of a first mode for performing the correction based on positions of a first number of indicators and a second mode for performing the correction based on a second number, smaller than the first number, of indicators.

14. A non-transitory computer-readable storage medium storing a program for causing a computer to execute a method of controlling a control apparatus, wherein the method comprises:

estimating a position corresponding to a gaze point of a user; and correcting the position corresponding to the gaze point of the user, based on a position of an indicator displayed on a display section and the position corresponding to the gaze point of the user and associated with the position of the indicator, wherein said correcting is performed in at least one of a first mode for performing the correction based on positions of a first number of indicators and a second mode for performing the correction based on a second number, smaller than the first number, of indicators.

* * * * *